(12) United States Patent
Kayashima et al.

(10) Patent No.: US 8,587,859 B2
(45) Date of Patent: Nov. 19, 2013

(54) WHITE PARTICLE FOR DISPLAY, PARTICLE DISPERSION FOR DISPLAY, DISPLAY MEDIUM, AND DISPLAY DEVICE

(75) Inventors: Hiroshi Kayashima, Kanagawa (JP); Jun Kawahara, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 222 days.

(21) Appl. No.: 13/304,488

(22) Filed: Nov. 25, 2011

(65) Prior Publication Data
US 2012/0327504 A1 Dec. 27, 2012

(30) Foreign Application Priority Data

Jun. 23, 2011 (JP) ................................ 2011-139516
Jun. 23, 2011 (JP) ................................ 2011-139517

(51) Int. Cl.
*G02B 26/00* (2006.01)
*G09G 3/34* (2006.01)
(52) U.S. Cl.
USPC .......................................... 359/296; 345/107

(58) Field of Classification Search
USPC .......... 359/296, 452; 345/107; 428/402, 405, 428/407; 525/477, 479; 526/336, 347; 524/267, 268, 730; 556/430
See application file for complete search history.

(56) References Cited

U.S. PATENT DOCUMENTS

| 8,404,881 B2 * | 3/2013 | Yamamoto et al. ........... 556/430 |
| 2008/0193769 A1 | 8/2008 | Yanagisawa et al. |
| 2013/0182312 A1 * | 7/2013 | Yamamoto et al. ........... 359/296 |

FOREIGN PATENT DOCUMENTS

| JP | A-2006-96985 | 4/2006 |
| JP | A-2007-231208 | 9/2007 |
| JP | A-2008-122468 | 5/2008 |

* cited by examiner

*Primary Examiner* — Loha Ben
(74) *Attorney, Agent, or Firm* — Oliff & Berridge, PLC

(57) ABSTRACT

A white particle for display includes as a constituent element a polymer including at least one species selected from a biphenyl compound having one vinyl group and a biphenyl compound having two vinyl groups as a polymeric component.

16 Claims, 6 Drawing Sheets

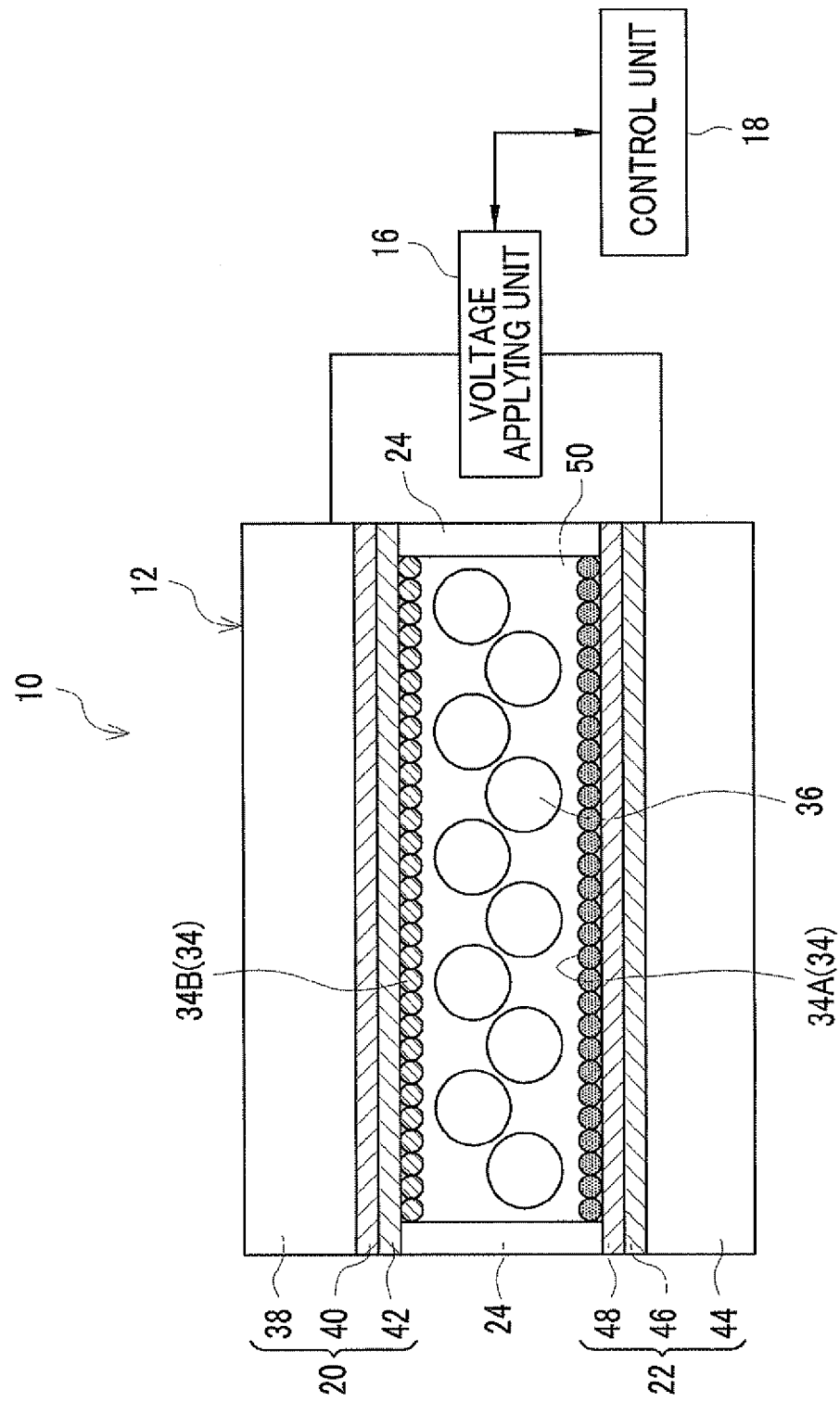

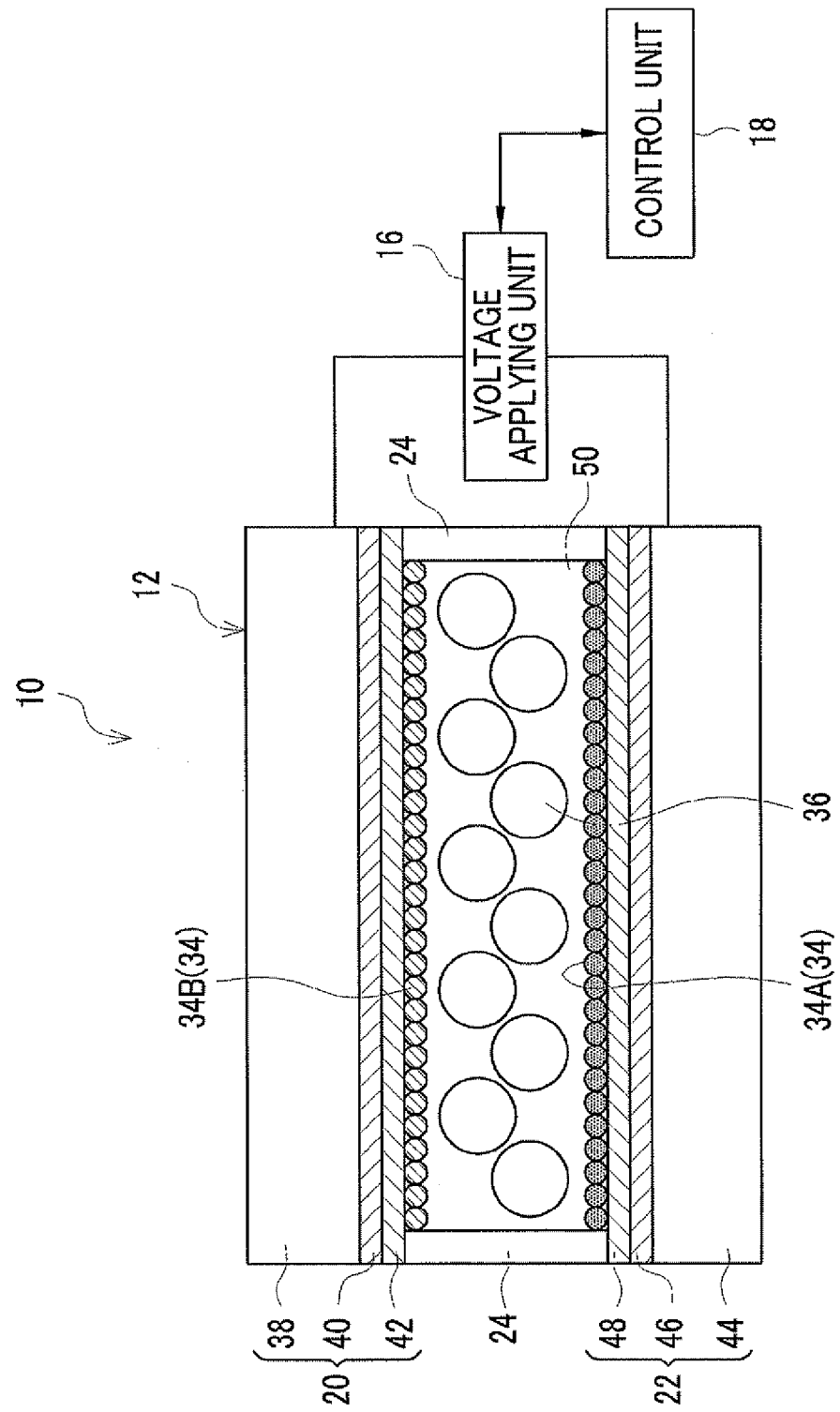

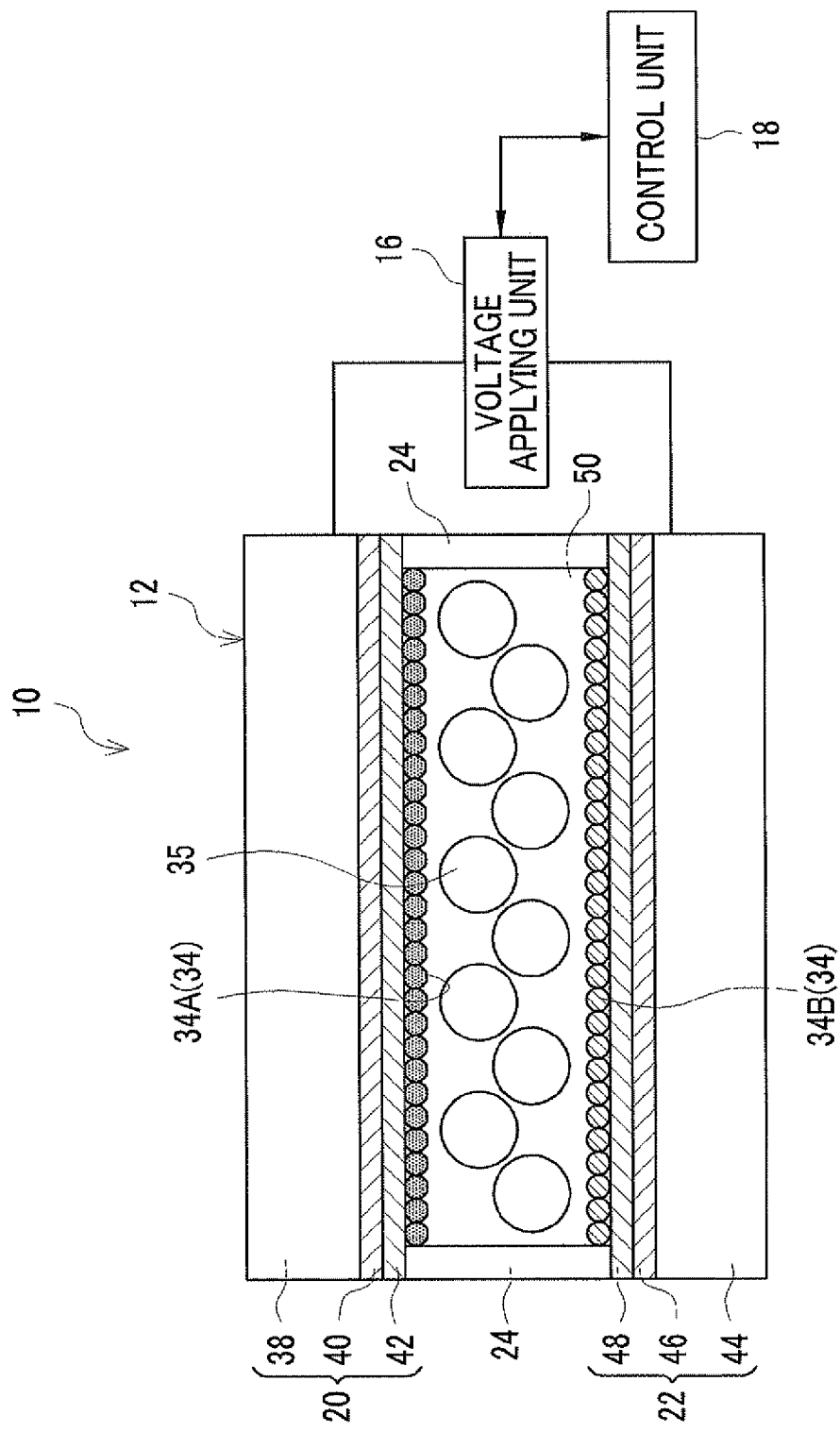

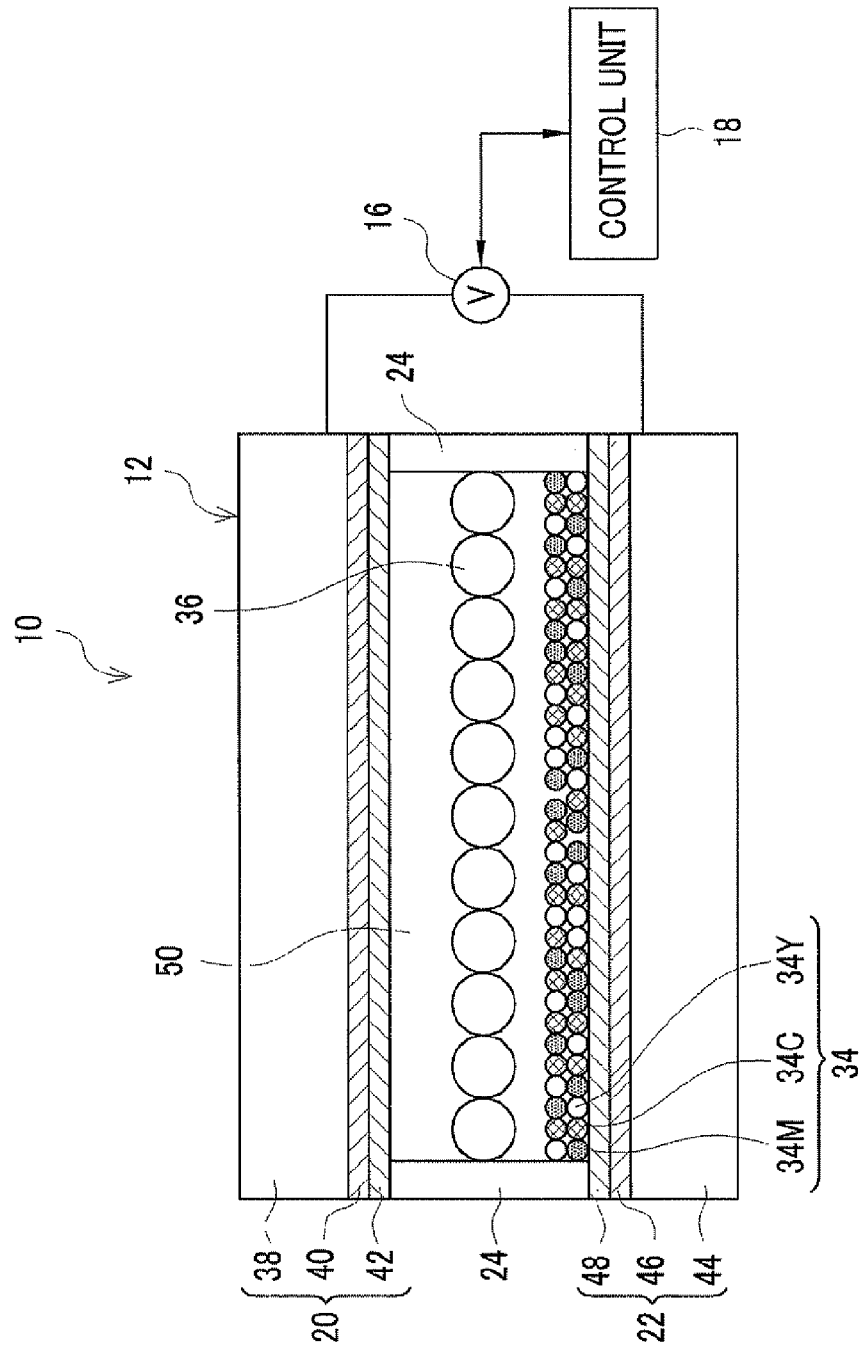

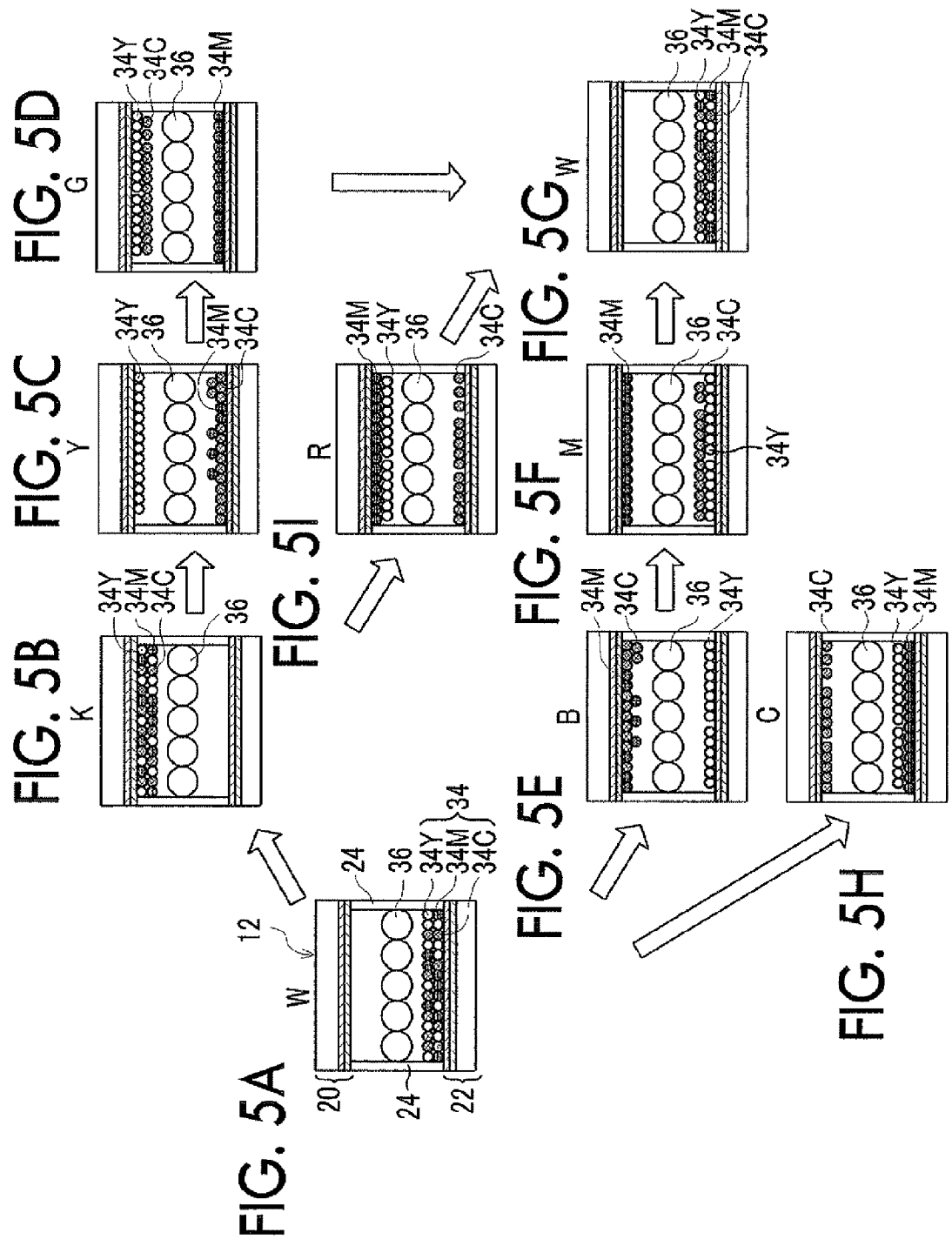

WHITE PARTICLE FOR DISPLAY, PARTICLE DISPERSION FOR DISPLAY, DISPLAY MEDIUM, AND DISPLAY DEVICE

CROSS-REFERENCE TO RELATED APPLICATIONS

This application is based on and claims priority under 35 USC 119 from Japanese Patent Application Nos. 2011-139516 and 2011-139517 filed Jun. 23, 2011.

BACKGROUND

1. Technical Field

The present invention relates to a white particle for display, a particle dispersion for display, a display medium, and a display device.

2. Related Art

A display medium using electrophoretic particles has been known as a repeatedly-rewritable display medium. For example, this display medium includes a pair of substrates and particles enclosed between the substrates so as to be movable between the substrates depending on an electric field formed between the pair of substrates. In such a display medium, white particles are often enclosed between the substrates so as to display white.

SUMMARY

According to an aspect of the invention, there is provided a white particle for display including as a constituent element: a polymer including at least one species selected from a biphenyl compound having one vinyl group and a biphenyl compound having two vinyl groups as a polymeric component.

BRIEF DESCRIPTION OF THE DRAWINGS

Exemplary embodiments of the present invention will be described in detail based on the following figures, wherein:

FIG. 1 is a diagram schematically illustrating the configuration of a display device according to a first exemplary embodiment of the invention;

FIGS. 2A and 2B are diagrams schematically illustrating a movement of a particle group when a voltage is applied between substrates of a display medium of the display device according to the first exemplary embodiment;

FIG. 3 is a diagram schematically illustrating the configuration of a display device according to a second exemplary embodiment of the invention;

FIGS. 5A to 5I are diagrams schematically illustrating the relationship between a voltage applied between substrates of a display medium and movements of particles.

DETAILED DESCRIPTION

Figure 4:
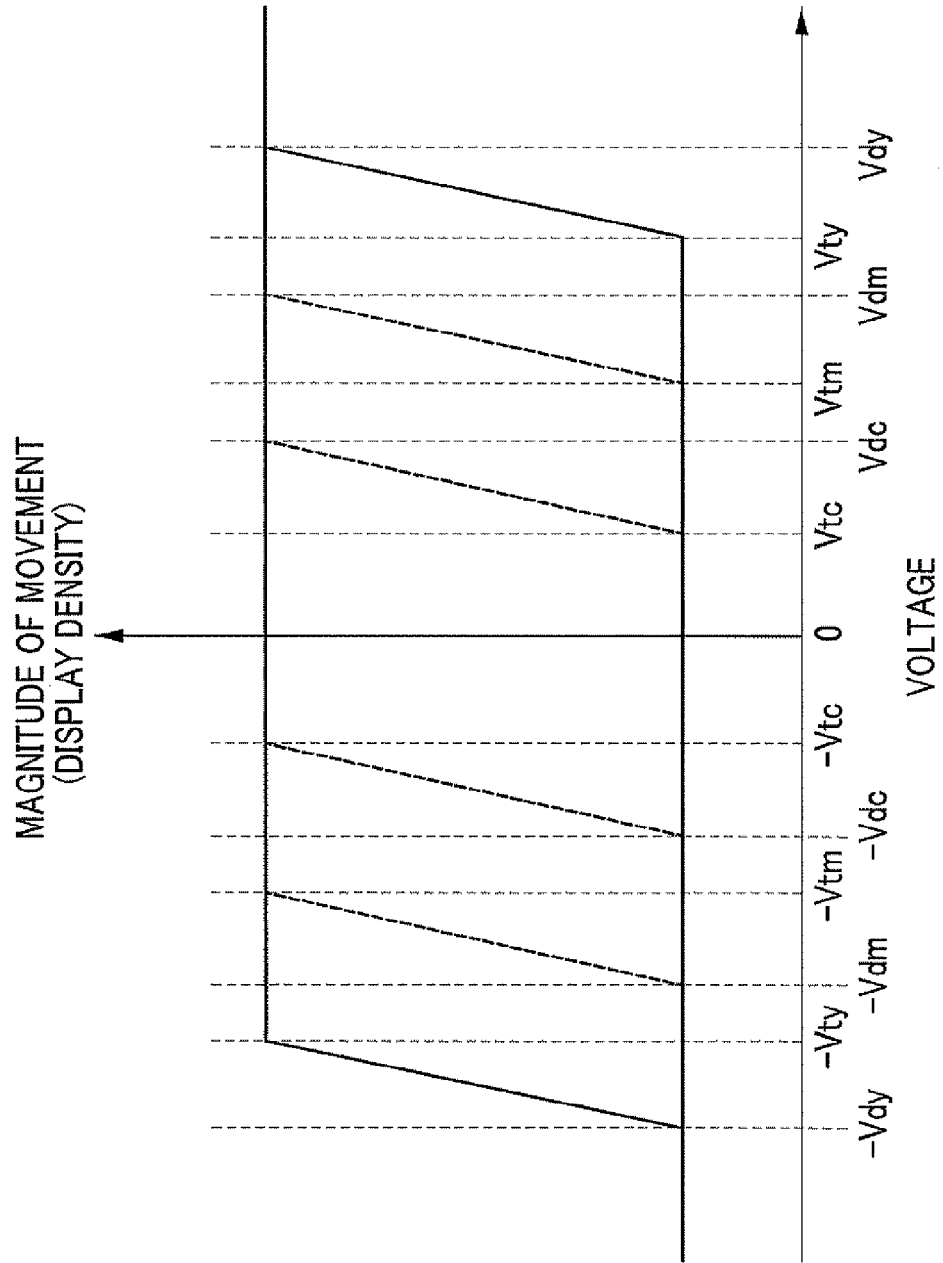
FIG. 4 is a diagram schematically illustrating the relationship between an applied voltage and the magnitude of movement of particles (display density) in the display device according to the second exemplary embodiment.

Hereinafter, exemplary embodiments of the invention will be described in detail.
White Particles for Display and Particle Dispersion for Display A white particle for display according to an exemplary embodiment of the invention includes as a constituent element a polymer including at least one species selected from a biphenyl compound having one vinyl group and a biphenyl compound having two vinyl groups (hereinafter, these two species of biphenyl compounds may be also referred to as "vinyl biphenyl compounds") as a polymeric component.

In a known display medium, when the background color is set to white, it is preferable that white particles for display be maintained in a state where they are floating in a dispersion medium, in view of retention of a white display.

Since inorganic white particles such as titanium oxide particles have a high refractive index, display with a high degree of whiteness is achieved. However, since the inorganic white particles have a high specific gravity (a high density), a precipitation phenomenon occurs with the passage of time and thus it is difficult to retain a stable white display.

On the contrary, in the white particles for display according to this exemplary embodiment, since the polymer including at least one species of vinyl biphenyl compound as a polymeric component is used as a constituent element, the precipitation is suppressed. This is because the polymer including at least one species of vinyl biphenyl compound as a polymeric component is a material having a low specific gravity (for example, a material having a specific gravity of 1.1 or less).

As a result, in a display medium (and a display device) employing the white particles for display according to this exemplary embodiment, it is possible to retain a stable white display.

In the white particles for display according to this exemplary embodiment, since the polymer including at least one species of vinyl biphenyl compound as a polymeric component is a material having a high refractive index (for example, in the range of from 1.63 to 1.66), it is also possible to achieve a white display with a high degree of whiteness.

In the white particles for display according to this exemplary embodiment, since the polymer including at least one species of vinyl biphenyl compounds as a polymeric component is a material having low chargeability, the electric field responsiveness is reduced. That is, the electrophoretic speed due to an electric field is lowered. As a result, in a display medium (and a display device), since the white particles for display are not electrophoresed well along with other colored display particles (electrophoretic particles) due to the electric field, it is difficult to affect the display characteristics of the other colored display particles (electrophoretic particles) and it is thus possible to suppress a mixed color display due to the electric field responsiveness of the white particles for display.

Each of the white particles for display according to this exemplary embodiment includes an inorganic white particle and a coating layer with which the inorganic white particle is coated.

The coating layer includes as a constituent element a polymer including at least one species selected from a biphenyl compound having one vinyl group and a biphenyl compound having two vinyl groups (hereinafter, these two species of biphenyl compounds may be also referred to as "vinyl biphenyl compounds") as a polymeric component.

In a known display medium, when a background color is set to white, it is preferable that the white particles for display are maintained in a state where they are floating in a dispersion medium, in view of retention of a white display.

Since inorganic white particles such as titanium oxide particles have a high refractive index, display with a high degree of whiteness is achieved. However, since the inorganic white particles have high electric field responsiveness based on a large amount of charge thereof, the electrophoretic speed due to the electric field is high and thus the inorganic white particles are electrophoreses to the display surface of the display medium along with other colored electrophoretic particles (display particles), thereby causing the mixed color display.

On the contrary, in the white particles for display according to this exemplary embodiments, since the surfaces of the inorganic white particles are coated with the coating layer including as a constituent element a polymer including at least one species of vinyl biphenyl compounds as a polymeric component, the electric field responsiveness is reduced. That is, the electrophoretic speed due to the electric field is lowered. This is because the polymer including at least one species of vinyl biphenyl compounds as a polymeric component is a material having low chargeability.

As a result, in the display medium (and the display device) employing the white particles for display according to this exemplary embodiments, since the electrophoretic speed of the white particles for display due to the electric field is lowered, that is, the white particles for display are not electrophoresed well along with other colored display particles (electrophoretic particles) due to the electric field, it is difficult to affect the display characteristics of the other colored display particles (electrophoretic particles) and it is thus possible to suppress the mixed color display due to the electric field responsiveness of the white particles for display.

In the white particles for display according to this exemplary embodiment, since the polymer including at least one species of vinyl biphenyl compounds as a polymeric component is a material having a high refractive index (for example, in the range of from 1.63 to 166), it is considered that the decrease in the degree of whiteness due to the coating of the surface of the inorganic white particles with the coating layer including the polymer as a constituent element is suppressed.

The components will be described below.

Each of the white particles for display according to this exemplary embodiment includes as a constituent element the polymer including at least one species selected from vinyl biphenyl compounds as a polymeric component.

That is the white particles for display according to this exemplary embodiment includes the polymer.

Specifically, the polymer serving as a constituent element of the white particles is preferably a copolymer of the polymeric component including at least one species selected from vinyl biphenyl compounds and another polymeric component.

At least one species selected from polymeric components having a silicone chain, polymeric components having an alkyl chain, and nonionic polymeric components may be used as the other polymeric component.

Examples of the polymer serving as the constituent element of the white particles include:

1) a copolymer of a polymeric component including at least one species selected from vinyl biphenyl compounds, a polymeric component having a silicone chain, and a nonionic polymeric component as needed;

2) a copolymer of a polymeric component including at least one species selected from vinyl biphenyl compounds, a polymeric component having an alkyl chain, and a nonionic polymeric component as needed; and 3) a copolymer of a polymeric component including at least one species selected from vinyl biphenyl compounds and a nonionic polymeric component.

The vinyl biphenyl compound is selected from biphenyl compounds having one vinyl group and biphenyl compounds having two vinyl groups.

Examples of the biphenyl compounds having one vinyl group include monovinylbiphenyl (for example, monovinylbiphenyl expressed by Structural Formula A). Examples of the biphenyl compounds having two vinyl groups include divinyl biphenyl (for example, divinyl biphenyl expressed by Structural Formula B)

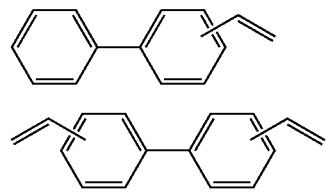

Structual Formula A

Structual Formula B

Examples of the polymeric component having a silicone chain (a monomer having a silicone chain) include dimethyl silicone monomer having a (meth)acrylate group at one terminal (silicone compounds expressed by Structural Formula 1, such as Silaplane FM-0711, FM-0721, and FM-0725 made by Chisso Corporation and X-22-174 DX, X-22-2426, X-22-2475 made by Shin-Etsu Silicone Co., Ltd.).

A monomer may be used or a macromonomer may be used as the polymeric component having a silicone chain. A "macromonomer" is a generic name of oligomers (with a degree of polymerization of from about 2 to 300) or polymers having a polymerizable functional group and has natures of both a polymer and a monomer.

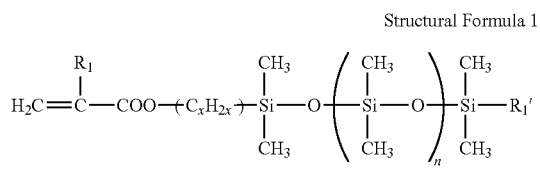

Structural Formula 1

In Structural Formula 1, $R_1$ represents a hydrogen atom or a methyl group, $R_1'$ represents a hydrogen atom or an alkyl group with a carbon number of 1 to 4, n represents a natural number (for example, in the range of from 1 to 1000 and preferably in the range of from 3 to 100), and x represents an integer of from 1 to 3.

Long-chain alkyl(meth)acrylates preferably having an alkyl chain with a carbon number of from 4 to 30 may be used as the polymeric component having an alkyl chain (a monomer having an alkyl chain) and specific examples thereof include butyl(meth)acrylate, hexyl(meth)acrylate, 2-ethylhexyl(meth)acrylate, dodecyl(meth)acrylate, and stearyl (meth)acrylate.

A nonionic monomer may be used as the nonionic polymeric component (a nonionic monomer) and specific examples thereof include (meth)acrylonitrile, alkyl ester (meth)acrylate, (meth)acrylamide, ethylene, propylene, butadiene, isoprene, isobutylene, N-alkyl-substituted (meth)acrylamide, vinylcarbazole, styrene, styrene derivatives, vinyl naphthalene, polyethylene glycol mono(meth)acrylate, vinyl chloride, vinylidene chloride, vinyl pyrrolidone, hydroxyethyl(meth)acrylate, and hydroxybutyl(meth)acrylate.

The expression "(meth)acryl" means both "acryl and methacryl", the expression "(meth)acrylo" means both "acrylo and methacrylo", and the expression "(meth)acrylate" means both "acrylate and methacrylate".

In the polymer serving as the constituent component of the white particles, the weight ratio of the vinyl biphenyl compound is preferably in the range of from 1 weight % to 99 weight % (more preferably in the range of from 10 weight % to 80 weight %) with respect to the total weight of the polymer.

The characteristics of the white particles for display will be described below.

The volume-average particle diameter of the white particles for display is, for example, in the range of from 0.1 μm to 10 μm, preferably in the range of from 0.15 μm to 5 μm, and more preferably in the range of from 1.5 μm to 1 μm.

The volume-average particle diameter of the particles is measured by the use of "FPAR-1000: Particle Size Analyzer" made by Otsuka Electronics Co., Ltd.

The method of producing the white particles for display will be described below.

Regarding the white particles for display, a dispersion is prepared, for example, by adding and mixing source components (monomers) of the polymers serving as constituent elements of the white particles and other additives such as a polymerization initiator as needed to an organic solvent.

Thereafter, when a polymerization reaction is made to proceed, for example, by heating the dispersion, polymers are precipitated to form particle-like products through the polymerization reaction.

Specifically, for example, a polymerizable site of the vinyl biphenyl compound as the polymeric component becomes incompatible in the organic solvent, is precipitated, and grows as a particle through the polymerization. Accordingly, when the polymer includes another polymeric component as the polymeric component, it may be considered that a particle grows while the polymerizable site of the vinyl biphenyl compound is being oriented to the inside and the polymerizable site of another polymeric component is being oriented to the outside.

For example, a solvent having the characteristic of dissolving the vinyl biphenyl compound but not dissolving the polymer thereof is employed as the organic solvent used herein, and specifically, a hydrocarbon solvent such as paraffin and hexane is used alone or a mixed solvent of the solvent, a silicone oil and an aromatic hydrocarbon solvent such as toluene is used.

The inorganic white particles will be described below.

Examples of the inorganic white particles include metal oxide particles such as titanium oxide particles, silicon oxide particles, zinc oxide particles, and tin oxide particles.

Among these, in view that it has a high refractive index and display with a high degree of whiteness is achieved, titanium oxide particles may be suitably used.

The coating layer will be described below.

The coating layer includes as a constituent element a polymer including at least one species selected from vinyl biphenyl compounds as one of polymeric components. That is, the coating layer includes the polymer.

Specifically, the polymer serving as a constituent element of the coating layer is preferably a copolymer of the polymeric component including at least one species selected from vinyl biphenyl compounds and another polymeric component.

At least one species selected from polymeric components having a silicone chain, polymeric components having an alkyl chain, and nonionic polymeric components may be used as the other polymeric component.

Examples of the polymer serving as the constituent element of the coating layer include:

1) a copolymer of a polymeric component including at least one species selected from vinyl biphenyl compounds, a polymeric component having a silicone chain, and a nonionic polymeric component as needed;

2) a copolymer of a polymeric component including at least one species selected from vinyl biphenyl compounds, a polymeric component having an alkyl chain, and a nonionic polymeric component as needed; and 3) a copolymer of a polymeric component including at least one species selected from vinyl biphenyl compounds and a nonionic polymeric component.

The vinyl biphenyl compound is selected from biphenyl compounds having one vinyl group and biphenyl compounds having two vinyl groups.

Examples of the biphenyl compounds having one vinyl group include monovinylbiphenyl (for example, monovinylbiphenyl expressed by Structural Formula A).

Examples of the biphenyl compounds having two vinyl groups include divinyl biphenyl (for example, divinyl biphenyl expressed by Structural Formula B).

The polymeric component having a silicone chain (the monomer having a silicone chain), the polymeric component having an alkyl chain (the monomer having an alkyl chain), and the nonionic polymeric component (the nonionic monomer) are the same as described above regarding the polymer serving as a constituent element of the white particles.

In the polymer serving as the constituent component of the coating layer, the weight ratio of the vinyl biphenyl compound is preferably in the range of from 1 weight % to 99 weight % (more preferably in the range of from 10 weight % to 80 weight %) with respect to the total weight of the polymer.

In the white particles for display, the amount of the coating layer with which the inorganic white particles are coated is, for example, in the range of from 1 weight % to 99 weight % with respect to the weight of the inorganic white particles and preferably in the range of from 5 weight % to 80 weight %.

The amount of the coating layer may be calculated, for example, as follows. For example, the produced white particles for display are centrifuged and precipitated and the weight of the precipitate is measured, whereby the amount of the coating layer is calculated as an amount increasing from the amount of the inorganic white particles. In another example, the amount of the coating layer may be calculated through the use of composition analysis or thermo-gravimetric analysis of the particles.

The method of producing the white particles for display will be described below.

Regarding the white particles for display, an inorganic white particle dispersion in which the inorganic white particles are dispersed in an organic solvent is prepared, and a mixed solution is prepared, for example, by adding and mixing source components (monomers) of the polymers serving as constituent elements of the coating layer and other additives such as a polymerization initiator as needed to the inorganic white particle dispersion.

Thereafter, when a polymerization reaction is made to proceed, for example, by heating the mixed solution, polymers are precipitated on the surface of the inorganic white particles through the polymerization reaction.

Specifically, for example, a polymerizable site of the vinyl biphenyl compound as the polymeric component becomes incompatible in the organic solvent, is precipitated, and is deposited in a layer form on the surfaces of the inorganic white particles through the polymerization. Accordingly, when the polymer includes another polymeric component as the polymeric component, it may be considered that the polymers are deposited in a layer form on the surfaces of the inorganic white particles while the polymerizable site of the vinyl biphenyl compound is being oriented to the inside and the polymerizable site of another polymeric component is being oriented to the outside.

Accordingly, white particles for display including the inorganic white particles coated with the coating layer including a specific copolymer as a constituent element may be obtained.

For example, a solvent having the characteristic of dissolving the vinyl biphenyl compound but not dissolving the polymer thereof is employed as the organic solvent used herein, and a hydrocarbon solvent such as paraffin and hexane is used alone or a mixed solvent of the solvent, a silicone oil and an aromatic hydrocarbon solvent such as toluene is used.

The particle dispersion for display employing the white particles for display will be described below.

The particle dispersion for display (the particle dispersion for display according to this exemplary embodiment) employing the white particles for display includes particle groups including the white particles for display and a dispersion medium in which the particle groups are dispersed.

The particle dispersion for display may include other display particles (electrophoretic particles) as the particle groups. Acid, alkali, salt, dispersant, a dispersion stabilizer, a stabilizer for anti-oxidation or UV absorption, an antibacterial agent, a preservative, and the like may be added to the particle dispersion for display as needed.

Various dispersion mediums used for a display medium may be employed as the dispersion medium, but a low-permittivity solvent (for example, with a permittivity of 5.0 or lower and preferably with permittivity of 3.0 or lower) may be preferably selected. The dispersion medium may be used together with a solvent other than the low-permittivity solvent, but preferably includes 50 vol % or more of the low-permittivity solvent. The permittivity of the low-permittivity solvent is measured by a permittivity meter (made by Nihon Rufuto Co., Ltd.).

Examples of the low-permittivity solvent include high-boiling-point solvents derived from petroleum such as a paraffin hydrocarbon solvent, a silicone oil, and a fluorine liquid and the low-permittivity solvent is preferably selected depending on the type of the copolymer as the constituent element of the coating layer.

Specifically, for example, when a copolymer including a polymeric component having a silicone chain as a polymeric component is used, the silicone oil may be preferably selected as the dispersion medium. When a copolymer including a polymeric component having an alkyl chain as a polymeric component is used, the paraffin hydrocarbon solvent may be preferably selected as the dispersion medium. However, the dispersion medium is not limited to the examples.

Examples of the silicone oil include silicone oils (such as dimethyl silicone oil, diethyl silicone oil, methylethyl silicone oil, methylphenyl silicone oil, and diphenyl silicone oil) in which a hydrocarbon group is coupled to a siloxane bond. Among these, the dimethyl silicone oil may be preferably used.

Examples of the paraffin hydrocarbon solvent include normal paraffin hydrocarbon with a carbon number of 20 or more (with a boiling-point of 80° C. or higher) and isoparaffin hydrocarbon, and isoparaffin may be preferably used in view of safety and volatility. Specific examples thereof include Shell Sol 71 (made by Shell Sekiyu K.K.), Isopar O, Isopar H, Isopar K, Isopar L, Isopar G, Isopar M (Isopar is a product name of Exxon Co.), and IP Solvent (made by Idemitsu Petrochemical Co., Ltd.).

Examples of the charging-control agent include ionic or nonionic surfactants, block or graft copolymers having a lipophilic part and a hydrophilic part, compounds having a polymer-chain skeleton such as cyclic, stellate, or dendritic polymers (dendrimers), salicylic metal complex, catechol metal complex, metal-containing bisazo dye, tetraphenyl borate derivatives, copolymers of polymerizable silicone macromer (Silaplane made by Chisso Corporation) and an anionic monomer or a cationic polymer More specific examples of the ionic or nonionic surfactants include the followings. Examples of the nonionic surfactant include polyoxyethylene nonylphenyl ether, polyoxyethylene octylphenyl ether, polyoxyethylene dodecylphenyl ether, polyoxyethylene alkyl ether, polyoxyethylene fatty ester, sorbitan fatty ester, polyoxyethylene sorbitan fatty ester, and fatty alkylolamide. Examples of the anionic surfactant include alkylbenzene sulfonate, alkylphenyl sulfonate, alkylnaphthalene sulfonate, higher fatty acid salt, sulfate ester salt of higher fatty ester, and sulfonic acid of higher fatty ester. Examples of the cationic surfactant include primary to tertiary amine salts and a quaternary ammonium salt. The content of these charging-control agents is preferable in the range of from 0.01 weight % to 20 weight % with respect to the particle solid content and more preferably in the range of from 0.05 weight % to 10 weight %.

The white particles for display and the particle dispersion for display according to this exemplary embodiment are used for an electrophoresis display medium and the like.

Display Medium and Display Device

Examples of a display medium and a display device according to an exemplary embodiment of the invention will be described below.

First Exemplary Embodiment

FIG. 1 is a diagram schematically illustrating the configuration of a display device according to a first exemplary embodiment of the invention. FIGS. 2A and 2B are diagrams schematically illustrating a movement of a particle group when a voltage is applied between substrates of a display medium of the display device according to the first exemplary embodiment.

The display device 10 according to the first exemplary embodiment is of a type in which an electrophoretic particle group, other than white particles, electrophoresing with an electric field is employed as a particle group 34 of the display medium 12 thereof and the white particle group including the white particles for display according to this exemplary embodiment is employed as a reflective particle group 36.

A particle group 34A and a particle group 34B having a different color and a different charging polarity from those of the particle group 34A are employed as the particle group 34.

The display device 10 according to this exemplary embodiment includes a display medium 12, a voltage applying unit 16 that applies a voltage to the display medium 12, and a control unit 18, as shown in FIG. 1.

The display medium 12 includes a display substrate 20 serving as an image display plane, a rear substrate 22 that faces the display substrate 20 with a gap interposed therebetween, a spacing member 24 that maintains a specific spacing between the substrates and that partitions the space between the display substrate 20 and the rear substrate 22 into plural cells, a particle group 34 that is enclosed in each cell, and a reflective particle group 36 that has an optical reflection characteristic different from that of the particle group 34.

A cell indicates a region surrounded with the display substrate 20, the rear substrate 22, and the spacing member 24. A dispersion medium 50 is enclosed in each cell. The particle group 34 includes plural particles, which are dispersed in the dispersion medium 50 and move (electrophorese) between the display substrate 20 and the rear substrate 22 through the spaces among the reflective particle groups 36 in accordance with the intensity of an electric field formed in each cell.

By disposing the spacing members 24 to correspond to pixels when an image is displayed on the display medium 12 and forming the cells to correspond to the cells, the display medium 12 may be configured to display an image pixel by pixel.

For the purpose of simplifying the explanation, this exemplary embodiment will be described with reference to the drawing paying attention to one cell. The configurations will be described below in detail.

First, a pair of substrates will be described.

The display substrate 20 has a configuration in which a front electrode 40 and a surface layer 42 are sequentially stacked on a base substrate 38. The rear substrate 22 has a configuration in which a rear electrode 46 and a surface layer 48 are sequentially stacked on a base substrate 44.

The display substrate 20 or both the display substrate 20 and the rear substrate 22 have a light-transmitting property. The light-transmitting property in this exemplary embodiment means that the transmittance of visible rays is 60% or higher.

Examples of the materials of the base substrate 38 and the base substrate 44 include glass or plastics such as a polyethylene terephthalate resin, a polycarbonate resin, an acrylic resin, a polyimide resin, a polyester resin, an epoxy resin, and a polyethersulfone resin.

Examples of the materials of the front electrode 40 and the rear electrode 46 include oxides of indium, tin, cadmium, and antimony, composite oxides such as ITO, metals such as gold, silver, copper, and nickel, and organic materials such as polypyrrole and polythiophene. The front electrode 40 and the rear electrode 46 may be any one of a single-layered film, a mixture film, and a composite film thereof. The thickness of the front electrode 40 and the rear electrode 46 is preferably in the range of from 100 Å to 2000 Å. The rear electrode 46 and the front electrode 40 may be formed, for example, in a matrix shape or a striped shape.

The front electrode 40 may be embedded in the base substrate 38. The rear electrode 46 may be embedded in the base substrate 44. In this case, the materials of the base substrate 38 and the base substrate 44 are selected depending on the particle compositions of the particle groups 34.

The rear electrode 46 and the front electrode 40 may be separated from the display substrate 20 and the rear substrate 22 respectively and may be disposed outside the display medium 12.

It has been described that the electrodes (the front electrode 40 and the rear electrode 46) are disposed in both the display substrate 20 and the rear substrate 22, but the electrodes may be disposed in only one substrate and may be driven in an active matrix type.

In order to drive the electrodes in an active matrix type, the base substrate 38 and the base substrate 44 may include a TFT (Thin Film Transistor) for each pixel. The TFT is preferably disposed in the rear substrate 22, not in the display substrate.

The surface layer will be described below.

The surface layer 42 and the surface layer 48 are formed on the front electrode 40 and the rear electrode 46, respectively. Examples of the materials of the surface layer 42 and the surface layer 48 include polycarbonate, polyester, polystyrene, polyimide, epoxy, polyisocyanate, polyamide, polyvinyl alcohol, polybutadiene, polymethyl methacrylate, copolymerized nylon, UV-curable acryl resins, and fluorine resins.

The surface layer 42 and the surface layer 48 may include the resin and a charge transport material and may include a self-supporting resin having a charge-transporting property.

The spacing member will be described below.

The spacing member 24 used to maintain an inter-substrate spacing between the display substrate 20 and the rear substrate 22 is formed of a thermoplastic resin, a thermosetting resin, an electron beam curable resin, a photo-curable resin, rubber, metal, or the like.

The spacing member 24 may be incorporated into any one of the display substrate 20 and the rear substrate 22. In this case, the structure is manufactured by performing an etching process of etching the base substrate 38 or the base substrate 44, a laser process, a pressing process or a printing process using a pre-formed mold, or the like.

In this case, the spacing member 24 is formed in any one or both of the display substrate 20 and the rear substrate 22.

The spacing member 24 may be chromatic or achromatic, but is preferably achromatic and transparent. In this case, the spacing member 24 is formed of a transparent resin such as polystyrene, polyester, or acryl.

The particle-like spacing members 24 are preferably transparent as well and glass particles may be used in addition to transparent resin particles of polystyrene, polyester, acryl, or the like.

The term "transparent" means that the transmittance of visible rays is 60% or higher.

The particle groups will be described below.

The particle groups 34 enclosed in the display medium 12 are preferably dispersed in a polymer resin as the dispersion medium 50. The polymer resin is preferably a polymeric gel or a high-molecular polymer.

Examples of the polymer resin include polymeric gels originating from natural polymers such as agarose, agaropectine, amylose, sodium alginate, propylene glycol ester alginate, isolichenan, insulin, ethyl cellulose, ethylhydroxyethyl cellulose, curdlan, casein, carrageenan, carboxymethyl cellulose, carboxymethyl starch, callose, agar, chitin, chitosan, silk fibroin, guar gum, quince seed, crown gall polysaccharide, glycogen, glucomannan, keratan sulfate, keratin protein, collagen, cellulose acetate, gellan gum, schizophyllan, gelatin, ivory palm mannan, tunicin, dextran, dermatan sulfate, starch, tragacanth gum, nigeran, hyaluronic acid, hydroxyethyl cellulose, hydroxypropyl cellulose, pustulan, funoran, degrading xyloglucan, pectin, porphyrane, methyl cellulose, methyl starch, laminaran, lichenan, lenthinan, and locust bean gum, and almost all polymer gels of synthetic polymers.

Polymers including a functional group of alcohol, ketone, ether, ester, and amide in a repeating unit may be also used, and examples thereof include polyvinyl alcohol, poly(meth) acrylamide or derivatives thereof, polyvinylpyrrolidone, polyethylene oxide, and copolymers including these polymers.

Among these, gelatin, polyvinyl alcohol, and poly(meth) acrylamide are preferably used in view of production stability, electrophoretic characteristics, and the like.

The polymer resins are preferably used as the dispersion medium 50 along with an insulating liquid.

The particle group 34 enclosed in each cell includes plural particles, which are dispersed in the dispersion medium 50 and moves between the display substrate 20 and the rear substrate 22 in accordance with the intensity of an electric field formed in the cell.

Examples of the particles of the particle group 34 include insulating metal oxide particles of glass bead, alumina, titanium oxide, or the like, thermoplastic or thermosetting resin particles, particles obtained by coating the surfaces of the resin particles with a colorant, particles containing an insulating colorant in the thermoplastic or thermosetting resins, and metal colloid particles having a Plasmon coloring function.

Examples of the thermoplastic resin used to produce the particles of the particle group 34 include polymers or copolymers of styrenes such as styrene and chlorostyrene, mono-olefins such as ethylene, propylene, butylene, and isoprene, vinyl esters such as vinyl acetate, vinyl propionate, vinyl benzoate, and vinyl butyrate, α-methylene aliphatic monocarboxylic esters such as methyl acrylate, ethyl acrylate, butyl acrylate, dodecyl acrylate, octyl acrylate, phenyl acrylate, methyl methacrylate, ethyl methacrylate, butyl methacrylate, and dodecyl methacrylate, vinyl ethers such as vinylmethyl ether, vinylethyl ether, and vinylbutyl ether, and vinyl ketones such as vinylmethyl ketone, vinylhexyl ketone, and vinylisopropenyl ketone.

Examples of the thermosetting resin used to produce the particles of the particle group 34 include cross-linked copolymers containing divinyl benzene as a main component, cross-linked resins such as cross-linked polymethyl methacrylate, phenol resins, urea resins, melamine resins, polyester resins, and silicone resins. Particularly, representative examples of a binder resin include polyestyrene, a styrene-alkyl acrylate copolymer, a styrene-alkyl methacrylate copolymer, a styrene-acrylonitrile copolymer, a styrene-butadiene copolymer, a styrene-maleic anhydride copolymer, polyethylene, polypropylene, polyester, polyurethane, an epoxy resin, a silicone resin, polyamide, denatured rosin, and paraffin wax.

Organic or inorganic pigments, oil-soluble dyes, and the like may be used as a colorant and examples thereof include magnetic powder such as magnetite and ferrite and known colarants such as carbon black, titanium oxide, magnesium oxide, zinc oxide, copper phthalocyanine-based cyan colorants, azo-based yellow colorants, azo-based magenta colorants, quinacridone-based magenta colorants, red colorants, green colorants, and blue colorants. Specific representative examples thereof include aniline blue, calcoil blue, chrome yellow, ultramarine blue, Dupont oil red, quinoline yellow, methylene blue chloride, phthalocyanine blue, malachite green oxalate, lamp black, rose bengal, C.I. pigment red 48:1, C.I. pigment red 122, C.I. pigment red 57:1, C.I. pigment yellow 97, C.I. pigment blue 15:1, and C.I. pigment blue 15:3. These may be used in combination with plural colorants.

A charging-control agent may be mixed into the resin of the particles of the particle group 34 as needed. Known materials used as an electrophotographic toner material may be used as the charging-control agent. Examples thereof include quarternary ammonium salts such as cetylpyridyl chloride, BONTRON P-51, BONTRON P-53, BONTRON E-84, and BONTRON E-81 (made by Orient Chemical Industries Co., Ltd.), salicylic acid-based metal complex, phenol condensates, tetraphenyl compounds, metal oxide particles, and metal oxide particles subjected to surface treatment using various coupling agents.

A magnetic material may be mixed to the inside or surface of the particles of the particle group 34 as needed. Color-coated inorganic magnetic materials or organic magnetic materials are used as the magnetic material as needed. Transparent magnetic materials, particularly, transparent organic magnetic materials, do not prevent the coloring of the coloring pigments and has a specific gravity smaller than that of the inorganic magnetic materials, which are preferable.

For example, the small-diameter coloring magnetic powder disclosed in JP-A-2003-131420 may be used as the colored magnetic powder. The colored magnetic powder includes a magnetic particle serving as a core and a coloring layer stacked on the surface of the magnetic particle. A coloring layer impermeably coating the magnetic powder with a pigment or the like may be selected as the coloring layer and, for example, an optical-interference thin film may be preferably used. The optical-interference thin film means a thin film formed of an achromatic material such as $SiO_2$ or $TiO_2$ with the same thickness as the wavelength of light and wavelength-selectively reflects the light by the optical interference inside the thin film.

An external additive may be added to the surface of the particles of the particle group 34 as needed. The color of the external additive is preferably transparent so as not to affect the color of the particles of the particle group 34.

Inorganic particles of metal oxides such as silicon oxide (silica), titanium oxide, and alumina are used as the external additive. In order to adjust the chargeability, the fluidity, the environment dependence, and the like of the particle group 34, the surface thereof may be treated with a coupling agent or a silicone oil.

Positively(+)-chargeable coupling agents such as an aminosilane-based coupling agent, an aminotitanium-based coupling agent, and a nitrile-based coupling agent and a negatively(−)-chargeable coupling agents such as a silane-based coupling agent not containing a nitrogen atom (containing atoms other than nitrogen), a titanium-based coupling agent, an epoxysilane-based coupling agent, an acrylsilane-based coupling agent may be used as the coupling agent. Positively (+)-chargeable silicone oils such as a denatured amino silicone oil and negatively(−)-chargeable silicone oils such as a dimethyl silicone oil, a denatured alkyl silicone oil, an α-denatured methylsulfone silicone oil, a methylphenyl silicone oil, a chlorophenyl silicone oil, and denatured fluorine silicone oil may be used as the silicone oil. These may be selected depending on desired resistance of the external additive.

Among the external additives, hydrophobic silica and hydrophobic titanium oxide which are well known may be preferably used and titanium compounds which are obtained by a reaction with $TiO(OH)_2$ disclosed in JP-A-10-003177 and a silane compound such as a silane coupling agent may be suitably used. Any of chlorosilane, alkoxysilane, silazane, and a special silylating agent may be used as the silane compound. The titanium compound is produced by causing the silane compound or the silicone oil to react with $TiO(OH)_2$ produced through a wet process and drying the resultant. Since a backing process of several hundred ° C. (degrees centigrade) is not performed, the strong bond between Ti is not formed, the aggregation does not occurs, and the particles of the particle group 34 are in a primary particle state. Since the silane compound or the silicone oil is made to directly react with $TiO(OH)_2$, the material throughput of the silane compound or the silicon oil may be made to increase and the charging property is controlled and the chargeability is also improved in comparison with titanium oxide in the related art, by adjusting the material throughput of the silane compound or the like.

The volume-average particle diameter of the external additive is generally in the range of from 5 nm to 100 nm and preferably in the range of from 10 nm to 50 nm, but is not limited to the range.

The mixing ratio of the external additive and the particles of the particle group 34 is adjusted on the basis of the balance between the particle diameter of the particle of the particle group 34 and the particle diameter of the external additive. When the amount of the external additive added is excessively large, a part of the external additive is separated from the particle surfaces of the particle group 34 and is attached to the particle surfaces of another particle group 34, whereby a desired charging property is not achieved. In general, the amount of the external additive is in the range of from 0.01 part by weight to 3 parts by weight with respect to 100 parts by weight of the particles of the particle group 34 and preferably in the range of from 0.05 part by weight to 1 part by weight.

The external additive may be added to only one type of particles of plural types of particle groups 34 or may be added to the particles of plural types or all types of particle groups 34. When the external additive is added to the surfaces of all the particles of the particle groups 34, it is preferable that the external additive may be added to the particle surfaces of the particle groups 34 with an impact or that the particle surfaces of the particle groups 34 are heated and the external additive is strongly secured to the particle surfaces of the particle groups 34. Accordingly, it is possible to prevent the separation of the external additive from the particles of the particle group 34, the strong aggregation of the external additives having different polarities, and the formation of an aggregate difficult to be dissociated in an electric field, and as a result, it is possible to prevent the deterioration in image quality.

Since the particles of the particle groups 34 move between the display substrate 20 and the rear substrate 22 with an electric field formed between the substrates, it is assumed that the characteristics such as average charged electricity or static electricity contributing to the movement in accordance with an electric field are adjusted in advance.

Specifically, the average charged electricity of the particles of the particle groups 34 may be adjusted by adjusting the type and amount of the charging-control agent to be mixed into the above-mentioned resins, the type and amount of the polymer chain to be coupled to the particle surfaces of the particle groups 34, the type and amount of the external additive to be added to or embedded in the particle surfaces of the particle groups 34, the type and amount of the surfactant, the polymer chain, and the coupling agent to be given to the particle surfaces of the particle groups 34, and the specific surface area (the volume-average particle diameter or the shaping factor of the particles of the particle groups 34) of the particles of the particle groups 34.

Any known method may be used as the method of producing the particles of the particle groups 34. For example, as disclosed in JP-A-7-325434, a method of weighing the resin, the pigment, and the charging-control agent in such a way that a specific mixing ratio is obtained, heating and melting the resin, adding the pigment therein for mixing and dispersing, and then cooling the dispersion, then preparing the particles of the particle groups 34 by the use of a pulverizer such as a jet mill, a hammer mill, and a turbo mill, and dispersing the resultant particles of the particle groups 34 in a dispersion medium is used. The particle dispersion medium of the particle groups 34 may be produced by preparing the particles of the particle groups 34 containing the charging-control agent through the use of a polymerization method such as suspension polymerization, emulsion polymerization, or dispersion polymerization or a coacervation, melt dispersion, or emulsion condensation method and then dispersing the resultant particles in the dispersion medium. In addition, a method using an appropriate apparatus in which a resin may be plasticized, a dispersion medium is not boiled, and source materials of the resin, the colorant, the charge-controlling agent, and the dispersion medium are dispersed and kneaded at a temperature lower than a decomposition point of the resin, the charging-control agent and/or the colorant may be used. Specifically, the pigment, the resin, and the charging-control agent are heated and melted in a dispersion medium by the use of a meteoric mixer, a kneader, or the like and the melted mixture is cooled with stirring, and solidified/precipitated using the temperature dependence of the solubility of the resin in a solvent, whereby the particles of the particle groups 34 are produced.

A method of inputting the source materials to an appropriate container containing particle-like media for dispersion and kneading, for example, a heated vibration mill such as an attritor and a heated ball mill and dispersing and kneading the container in a preferable temperature range such as the range of 80° C. to 160° C. is used. Steel such as stainless steel and carbon steel, alumina, zirconium oxide, silica, and the like are preferably used as the particle-like media. When it is intended to produce the particles of the particle groups 34 using this method, the source materials put into a fluid state in advance are additionally dispersed in the container by the use of the particle-like media and the dispersion medium is cooled to precipitate the resin including the colorant from the dispersion medium. The particle-like media maintain the moving state even during the cooling and after the cooling and cause the shearing and/or the impact to reduce the particle diameters.

The content (weight %) of the particle groups 34 with respect to the total weight in a cell is not particularly limited, as long as the content is a concentration by which a desired hue is achieved. It is effective for the display medium 12 that the content is adjusted depending on the thickness of the cell (that is, the distance between the display substrate 20 and the rear substrate). That is, in order to achieve a desired hue, the content may be made to decrease as the thickness of the cell increases and the content may be made to increase as the thickness of the cell decreases. In general, the content is in the range of from 0.01 weight % to 50 weight %.

The reflective particle group will be described below.

The reflective particle group 36 includes reflective particles having an optical reflection characteristic different from that of the particle groups 34 and serves as a reflecting member displaying a color different from that of the particle groups 34. The reflective particle group 36 has a function of a void member causing the particles to move without interfering with the movement between the display substrate 20 and the rear substrate 22. That is, the particles of the particle groups 34 move from the rear substrate 22 to the display substrate 20 or from the display substrate 20 to the rear substrate 22 through the voids of the reflective particle group 36.

The white particle group of the white particles for display according to this exemplary embodiment is employed as the reflective particle group 36.

The other configuration of the display medium will be described below.

The size of the cell in the display medium 12 has a close relation with the resolution of the display medium 12. As the cell size decreases, the display medium 12 may display an image with a higher resolution. The length in the in-plane direction of the display substrate 20 of the display medium 12 is generally in the range of from 10 µl to 1 mm.

In order to fix the display substrate 20 and the rear substrate 22 each other through the spacing member 24 interposed therebetween, a fixing member such as a combination of a bolt and a nut, a clamp, a clip, and a substrate-fixing frame is used. A fixing member such as an adhesive, thermal fusion, and ultrasonic adhesion may be used.

The display medium 12 having the above-mentioned configuration is used, for example, in a bulletin board, a circulation board, an electronic white board, an advertisement, a sign board, a flicker sign, an electronic paper, an electronic newspaper, an electronic book, and a document sheets used in common in a copier and a printer in which images are stored and rewritten.

The display device will be described below.

As described above, the display device 10 according to this exemplary embodiment includes a display medium 12, a voltage applying unit 16 applying a voltage to the display medium 12, and a control unit 18 (see FIG. 1).

The voltage applying unit 16 is electrically connected to the front electrode 40 and the rear electrode 46. It is described in this exemplary embodiment that both the front electrode 40 and the rear electrode 46 are electrically connected to the voltage applying unit 16, but one of the front electrode 40 and the rear electrode 46 may be grounded and the other may be connected to the voltage applying unit 16.

The voltage applying unit 16 is connected to the control unit 18 to transmit and receive signals thereto and therefrom.

The control unit 18 may be embodied by a microcomputer including a CPU (Central Processing Unit) controlling the entire operation of the device, a RAM (Random Access Memory) temporarily storing various data, and a ROM (Read Only Memory) in which various programs such as a control program for controlling the entire device are stored in advance.

The voltage applying unit 16 is a voltage applying device applying a voltage to the front electrode 40 and the rear electrode 46 and applies a voltage corresponding to the control of the control unit 18 to the front electrode 40 and the rear electrode 46.

The operation of the display device 10 will be described below. This operation will be described on the basis of the operation of the control unit 18.

Here, it is assumed that the particle group 34A out of the particle groups 34 enclosed in the display medium 12 is charged to the negative (−) polarity and the particle group 34B is charged to the positive (+) polarity. It is assumed that the dispersion medium 50 is transparent and the reflective particle group 36 is white. That is, in this exemplary embodiment, the display medium 12 displays the colors presented by the particle group 34A and the particle group 34B based on the movements thereof and displays white as a background color.

First, an initial operation signal indicating that a voltage is applied for a specific time so that the front electrode 40 has the negative (−) polarity and the rear electrode 46 has the positive (+) polarity is output to the voltage applying unit 16. When a voltage equal to or greater than a threshold voltage which is negative (−) polarity and with which the variation in density is ended is applied between the substrates, the particles of the particle group 34A charged to the negative (−) polarity move to the rear substrate 22 and reaches the rear substrate 22 (see FIG. 2A). On the other hand, the particles of the particle group 34B charged to the positive (+) polarity move to the display substrate 20 and reaches the display substrate 20 (see FIG. 2A).

At this time, the color of the display medium 12 recognized from the display substrate 20 is the color of the particle group 34B with a background color of white which is the color of the reflective particle group 36. The particle group 34A is hidden by the reflective particle group 36 and is hardly recognized.

As information indicating a voltage application time in applying a voltage in the initial operation, the time T1 may be stored in a memory such as the ROM not shown in the control unit 18 in advance. When performing the operation, the information indicating the specific time may be read out.

When a voltage is applied between the front electrode 40 and the rear electrode 46 so that the front electrode 40 has the positive (+) polarity and the rear electrode 46 has the negative (−) polarity by reversing the polarity obtained when a voltage is applied between the substrates, the particle group 34A charged to the negative (−) polarity moves to the display substrate 20 and reaches the display substrate 20 (see FIG. 2B). On the other hand, the particles of the particle group 34B charged to the positive (+) polarity move to the rear substrate 22 and reaches the rear substrate 22 (see FIG. 2B).

At this time, the color of the display medium 12 recognized from the display substrate 20 is the color of the particle group 34A with a background color of white which is the color of the reflective particle group 36. The particle group 34B is hidden by the reflective particle group 36 and is hardly recognized.

In this way, in the display device 10 according to this exemplary embodiment, the particle groups 34 (the particle group 34A and the particle group 34B) reach the display substrate 20 or the rear substrate 22 and are attached thereto, whereby a display is made.

Second Exemplary Embodiment

A display device according to a second exemplary embodiment of the invention will be described below. FIG. 3 is a diagram schematically illustrating the configuration of a display device according to the second exemplary embodiment of the invention. FIG. 4 is a diagram schematically illustrating the relationship between an applied voltage and a movement magnitude of particles (display density) in the display device according to the second exemplary embodiment. FIG. 5 is a diagram schematically illustrating the relationship between a voltage applied between substrates of a display medium and movements of particles in the display device according to the second exemplary embodiment.

The display device 10 according to the second exemplary embodiment employs three types of particle groups 34. The three types of particle groups 34 are all charged to the same polarity.

The display device 10 according to the second exemplary embodiment includes a display medium 12, a voltage applying unit 16 that applies a voltage to the display medium 12, and a control unit 18, as shown in FIG. 3.

In the display device 10 according to the second exemplary embodiment, the same elements as in the display device 10 according to the first exemplary embodiment will be referenced by the same reference numerals and the detailed description thereof will not be repeated.

The display medium 12 includes a display substrate 20 serving as an image display plane, a rear substrate 22 that faces the display substrate 20 with a gap interposed therebetween, a spacing member 24 that maintains a specific spacing between the substrates and that partitions the space between the display substrate 20 and the rear substrate 22 into plural cells, a particle group 34 that is enclosed in each cell, and a reflective particle group 36 that has an optical reflection characteristic different from that of the particle group 34.

The opposing surfaces of the display substrate 20 and the rear substrate 22 are charged in the same way as described in the first exemplary embodiment and the surface layer 42 and the surface layer 48 are formed on the opposing surfaces, respectively.

In this exemplary embodiment, plural types of particle groups 34 having different colors are dispersed as the particle group 34 in a dispersion medium 50.

It is described in this exemplary embodiment that particle groups 34 having different colors, that is, a yellow particle group 34Y, a magenta particle group 34M, and a cyan particle group 34C are dispersed as three types of particle groups 34, but the particle groups are not limited to three types.

The plural types of particle groups 34 are particle groups electrophoresing between the substrates and the absolute values of voltages necessary for moving in accordance with an electric field are different in the color particle groups. That is, the color particle groups 34 (the yellow particle group 34Y, the magenta particle group 34M, and the cyan particle group 34C) have voltage ranges necessary for causing the color particle groups 34 to move by colors and the voltage ranges are different.

The particles of the plural types of particle groups 34 having different absolute values of voltages necessary for moving in accordance with an electric field may be obtained by changing the type or concentration of the resin constituting the particles and the amount of the charging-control agent in the materials constituting the electrophoretic particles to prepare particle dispersions including the particles having different charged electricity and mixing the prepared particle dispersions.

As described above, the yellow particle group 34Y, the magenta particle group 34M, and the cyan particle group 34C having different colors are dispersed as three types of particle groups 34 in the display medium 12 according to this exemplary embodiment, and the plural types of particle groups 34 are different in the absolute value of a voltage necessary for moving in accordance with an electric field among the color particle groups.

In this exemplary embodiment, it is assumed that the absolute values of the voltages when three color particle groups of the magenta particle group 34M, the cyan particle group 34C, and the yellow particle group 34Y start their movement are |Vtm| for the magenta particle group 34M, |Vtc| for the cyan particle group 34C, and |Vty| for the yellow particle group 34Y. It is assumed that the absolute values of the maximum voltages for causing all the three color particle groups 34 of the magenta particle group 34M, the cyan particle group 34C, and the yellow particle group 34Y to move are |Vdm| for the magenta particle group 34M, |Vdc| for the cyan particle group 34C, and |Vdy| for the yellow particle group 34Y.

The absolute values of Vtc, −Vtc, Vdc, −Vdc, Vtm, −Vtm, Vdm, −Vdm, Vty, −Vty, Vdy, and −Vdy to be described below have a conditional relation of |Vtc|<|Vdc|<|Vtm|<|Vdm|<|Vty|<|Vdy|.

Specifically, as shown in FIG. 4, three types of particle groups 34 are dispersed in the dispersion medium 50 in a state where they are charged to the same polarity and the absolute value of the voltage range necessary for causing the cyan particle group 34C to move |Vtc|≤Vc≤|Vdc| (the absolute value of a value in the range of from Vtc to Vdc), absolute value of the voltage range necessary for causing the magenta particle group 34M |Vtm|≤Vm≤|Vdm| (the absolute value of a value in the range of from Vtm to Vdm), and the absolute value of the voltage range necessary for causing the yellow particle group 34Y to move |Vty|≤Vy≤|Vdy| (the absolute value of a value in the range of from Vty to Vdy) are set to sequentially increase in this order without overlapping with each other.

In order to independently drive the color particle groups 34, the absolute value of the maximum voltage for causing all the cyan particle group 34C to move |Vdc| is set to be smaller than the absolute value of the voltage range necessary for causing the magenta particle group 34M to move |Vtm|≤Vm≤|Vdm| (the absolute value of a value in the range of from Vtm to Vdm) and the absolute value of the voltage range necessary for causing the yellow particle group 34Y to move |Vty|≤Vy≤|Vdy| (the absolute value of a value in the range of from Vty to Vdy). The absolute value of the maximum voltage for causing all the magenta particle group 34M to move |Vdm| is set to be smaller than the absolute value of the voltage range necessary for causing the yellow particle group 34Y to move |Vty|≤Vy≤|Vdy| (the absolute value of a value in the range of from Vty to Vdy).

That is, in this exemplary embodiment, the color particle groups 34 are independently driven by setting the voltage ranges necessary for causing the color particle groups 34 to move so as not to overlap with each other.

A "voltage range necessary for causing a particle group 34 to move" means a voltage range from a voltage necessary for starting the movement of the particles until the variation in display density is not caused and the display density is saturated even with the increase in voltage and voltage application time after the movement is started.

A "maximum voltage necessary for causing all the particle group 34 to move" means a voltage at which the variation in display density is not caused and the display density is saturated even with the increase in voltage and voltage application time after the movement is started.

"All" includes that the characteristic of some particles of the particle groups 34 differs to the extent that it does not contribute to the display characteristic because of the characteristic unevenness of the color particle groups 34. That is, in this state, the variation in display density is not caused and the display density is saturated, even when the voltage and the voltage application time are made to increase from the start of movement.

A "display density" means a density obtained by measuring the color density on the display surface with a reflection density meter of an optical density (=OD), for example, with a reflection density meter made by X-Rite Inc., when a voltage is applied between the display surface and the rear surface, the voltage is slowly changed (made to increase or decrease the applied voltage) in a direction in which the measured density increases, the density variation per unit voltage is saturated, and the display density does not vary to saturate the display density even with the increase in voltage and voltage application time in that state.

In the display medium 12 according to this exemplary embodiment, when a voltage is applied between the display substrate 20 and the rear substrate 22, the voltage value of the applied voltage is made to slowly increase from 0V, and when the voltage applied between the substrates exceeds +Vtc, the variation in display density appears due to the movement of the cyan particle 34C in the display medium 12. When the voltage value is made to further increase and the voltage applied between the substrates reaches +Vdc, the variation in display density due to the movement of the cyan particle group 34C in the display medium 12 is stopped.

When the voltage value is made to further increase and the voltage applied between the display substrate 20 and the rear substrate 22 exceeds +Vtm, the variation in display density due to the movement of the magenta particle group 34M in the display medium 12 appears. When the voltage value is made to further increase and the voltage applied between the display substrate 20 and the rear substrate 22 reaches +Vdm, the variation in display density due to the movement of the magenta particle group 34M in the display medium 12 is stopped.

When the voltage value is made to further increase and the voltage applied between the substrates exceeds +Vty, the variation in display density due to the movement of the yellow particle group 34Y in the display medium 12 appears. When the voltage value is made to further increase and the voltage applied between the substrates reaches +Vdy, the variation in display density due to the movement of the yellow particle group 34Y in the display medium 12 is stopped.

On the contrary, when a minus voltage is applied between the display substrate 20 and the rear substrate 22, the absolute value of the voltage is made to slowly increase from 0 V, and when the absolute value of the voltage applied between the substrates exceeds the absolute value of −Vtc, the variation in display density appears due to the movement of the cyan particle 34C between the substrates in the display medium 12. When the absolute value of the voltage is made to further increase and the voltage applied between the display substrate 20 and the rear substrate 22 reaches −Vdc, the variation in display density due to the movement of the cyan particle group 34C in the display medium 12 is stopped.

When the absolute value of the voltage is made to further increase, a minus voltage is applied, and the voltage applied between the display substrate 20 and the rear substrate 22 exceeds the absolute value of −Vtm, the variation in display density due to the movement of the magenta particle group 34M in the display medium 12 appears. When the absolute value of the voltage is made to further increase and the voltage applied between the display substrate 20 and the rear substrate 22 reaches −Vdm, the variation in display density due to the movement of the magenta particle group 34M in the display medium 12 is stopped.

When the absolute value of the voltage is made to further increase, a minus voltage is applied, and the absolute value of the voltage applied between the display substrate 20 and the rear substrate 22 exceeds the absolute value of −Vty, the variation in display density due to the movement of the yellow particle group 34Y in the display medium 12 appears. When the absolute value of the voltage is made to further increase and the voltage applied between the substrates reaches −Vdy, the variation in display density due to the movement of the yellow particle group 34Y in the display medium 12 is stopped.

That is, in this exemplary embodiment, when a voltage in the range of from −Vtc to +Vtc (equal to or less than the voltage range |Vtc|) is applied between the display substrate 20 and the rear substrate 22 as shown in FIG. 4, it may be said that such a movement of the particles of the particle groups 34 (the cyan particle group 34C, the magenta particle group 34M, and the yellow particle group 34Y) enough to cause a variation in display density of the display medium 12 does not appear. When a voltage higher than the absolute value of the voltages +Vtc and −Vtc is applied between the substrates, such a movement of the particles of the cyan particle group 34C out of three color particle groups 34 enough to cause a variation in display density of the display medium 12 appears and the variation in display density appears. When a voltage equal to or higher than the absolute value |Vdc| of the voltages −Vdc and Vdc is applied, the variation in display density per unit voltage does not appear.

When a voltage in the range of from −Vtm to +Vtm (equal to or less than the voltage range |Vtm|) is applied between the display substrate 20 and the rear substrate 22, it may be said that such a movement of the particles of the magenta particle group 34M and the yellow particle group 34Y enough to cause a variation in display density of the display medium 12 does not appear. When a voltage higher than the absolute value of the voltages +Vtm and −Vtm is applied between the substrates, such a movement of the particles of the magenta particle group 34M out of the magenta particle group 34M and the yellow particle group 34Y enough to cause a variation in display density of the display medium 12 appears and the variation in display density per unit voltage appears. When a voltage equal to or higher than the absolute value |Vdm| of the voltages −Vdm and Vdm is applied, the variation in display density does not appear.

When a voltage in the range of from −Vty to +Vty (equal to or less than the voltage range |Vty|) is applied between the display substrate 20 and the rear substrate 22, it may be said that such a movement of the particles of the yellow particle group 34Y enough to cause a variation in display density of the display medium 12 does not appear. When a voltage higher than the absolute value of the voltages +Vty and −Vty is applied between the substrates, such a movement of the particles of the yellow particle group 34Y enough to cause a variation in display density of the display medium 12 appears and the variation in display density appears. When a voltage equal to or higher than the absolute value |Vdy| of the voltages −Vdy and Vdy is applied, the variation in display density does not appear.

A movement mechanism of the particles when displaying an image on the display medium 12 will be described below with reference to FIGS. 5A to 5I.

For example, it is assumed that the yellow particle group 34Y, the magenta particle group 34M, and the cyan particle group 34C described with reference to FIG. 4 are enclosed as the plural types of particle groups 34 in the display medium 12.

Hereinafter, a voltage which is higher than the absolute value of the voltage necessary for starting the movement of the particles of the yellow particle group 34Y and equal to or lower than the maximum voltage of the yellow particle group 34Y and which is applied between the substrates is referred to as a "high voltage", a voltage which is higher than the absolute value of the voltage necessary for starting the movement of the particles of the magenta particle group 34M and equal to or lower than the maximum voltage of the magenta particle group 34M and which is applied between the substrates is referred to as a "middle voltage", and a voltage which is higher than the absolute value of the voltage necessary for starting the movement of the particles of the cyan particle group 34C and equal to or lower than the maximum voltage of the cyan particle group 34C and which is applied between the substrates is referred to as a "low voltage".

When voltages are applied between substrates and voltages higher than a voltage applied to the rear substrate 22 are applied to the display substrate 20, the voltages are referred to as a "+ high voltage", a "+ middle voltage", and a "+ low voltage". When voltages are applied between substrates and voltages higher than a voltage applied to the display substrate 20 are applied to the rear substrate 22, the voltages are referred to as a "− high voltage", a "− middle voltage", and a "− low voltage".

As shown in FIG. 5A, it is assumed that all the magenta particle group 34M, the cyan particle group 340, and the yellow particle group 34Y as all the particle groups are located on the rear substrate 22 in the initial state (In a white-displayed state). Then, when the "+ high voltage" is applied between the display substrate 20 and the rear substrate 22 in the initial state, the magenta particle group 34M, the cyan particle group 34C, and the yellow particle group 34Y as all the particle groups move to the display substrate 20. Even when the application of the voltage is stopped in this state, the particle groups do not move and remain in a state where they are attached to the display substrate 20 and black-displayed state is maintained by the subtractive color mixture based on the magenta particle group 34M, the cyan particle group 34C, and the yellow particle group 34Y (the subtractive color mixture of magenta, cyan, and yellow) (see FIG. 5B).

When the "− middle voltage" is applied between the display substrate 20 and the rear substrate 22 in the state shown in FIG. 5B, the magenta particle group 34M and the cyan particle group 34C out of all the color particle groups 34 move to the rear substrate 22. Accordingly, since only the yellow particle group 34Y is attached to the display substrate 20, a yellow display is achieved (see FIG. 5C).

When the "+ low voltage" is applied between the display substrate 20 and the rear substrate 22 in the state shown in FIG. 5C, the cyan particle group 34O out of the magenta particle group 34M and the cyan particle group 34C which has moved to the rear substrate 22 moves to the display substrate 20. Accordingly, since the yellow particle group 34Y and the cyan particle group 34O are attached to the display substrate 20, a green display is achieved by the subtractive color mixture of yellow and cyan (see FIG. 5D).

When the "− low voltage" is applied between the display substrate 20 and the rear substrate 22 in the state shown in FIG. 5D, the cyan particle group 34O out of all the particle groups 34 moves to the rear substrate 22. Accordingly, since the yellow particle group 34Y and the magenta particle group 34M are attached to the display substrate 20, a red display is achieved by the additive color mixture of yellow and magenta (see FIG. 5I).

On the other hand, when the "+ middle voltage" is applied between the display substrate 20 and the rear substrate 22 in the initial state shown in FIG. 5A, the magenta particle group 34M and the cyan particle group 34C out of all the color particle groups 34 (the magenta particle group 34M, the cyan particle group 34C, and the yellow particle group 34Y) move to the display substrate 20. Accordingly, since the magenta particle group 34M and the cyan particle group 34C are attached to the display substrate 20, a blue display is achieved by the subtractive color mixture of magenta and cyan (see FIG. 5E).

When the "− low voltage" is applied between the display substrate 20 and the rear substrate 22 in the state shown in FIG. 5E, the cyan particle group 34C out of the magenta particle group 34M and the cyan particle group 34C attached to the display substrate 20 moves to the rear substrate 22.

Accordingly, since only the magenta particle group 34M is attached to the display substrate 20, a magenta display is achieved (see FIG. 5F).

When the "− high voltage" is applied between the display substrate 20 and the rear substrate 22 in the state shown in FIG. 5F, the magenta particle group 34M attached to the display substrate 20 moves to the rear substrate 22.

Accordingly, since no particle group is attached to the display substrate 20, a white display is achieved by the color of the reflective particle group 36 (see FIG. 5G).

When the "+ low voltage" is applied between the display substrate 20 and the rear substrate 22 in the initial state shown in FIG. 5A, the cyan particle group 34O out of all the particle groups 34 (magenta particle group 34M, the cyan particle group 34C, and the yellow particle group 34Y) moves to the display substrate 20. Accordingly, since the cyan particle group 34C is attached to the display substrate 20, a cyan display is achieved (see FIG. 5H).

When the "− high voltage" is applied between the display substrate 20 and the rear substrate 22 in the state shown in FIG. 5I, all the particle groups 34 move to the rear substrate 22 and a white display is achieved, as shown in FIG. 5G.

When the "− high voltage" is applied between the display substrate 20 and the rear substrate 22 in the state shown in FIG. 5D, all the particle groups 34 move to the rear substrate 22 and a white display is achieved, as shown in FIG. 5G.

In this exemplary embodiment, by applying voltages corresponding to the particle groups 34 between the substrates, the desired particles are selectively made to move on the basis of the electric field based on the corresponding voltage. Accordingly, the movement of the color particles other than a desired color in the dispersion medium 50 is suppressed to suppress a color mixture in which a color other than the desired color is mixed and to suppress the deterioration in image quality of the display medium 12, thereby achieving a color display.

When the absolute values of the voltages necessary for causing the particle groups 34 to move in accordance with an electric field are different from each other, a vivid color display is achieved even if the voltage ranges necessary for causing the particle groups to move in accordance with the electric field overlap with each other. However, when the voltage ranges are different from each other, it is possible to achieve a color display of which the color mixture is further suppressed.

Cyan, magenta, yellow, blue, red, green, and black may be displayed by dispersing three particle groups 34 of cyan, magenta, and yellow in the dispersion medium 50 and white may be displayed by the use of the white reflective particle group 36, whereby a specific color display may be achieved.

In the display medium 12 and the display device 10 according to any of the above-mentioned exemplary embodiments, it has been stated that the front electrode 40 is formed on the display substrate 20, the rear electrode 46 is formed on the rear substrate 22, and a voltage is applied between the electrodes (that is, between the substrates) to cause the particle groups 34 to move (be electrophoresed) between the substrates to achieve a display, but the invention is not limited to this configuration. A configuration in which the particle groups move between the electrodes, for example, a configuration in which the front electrode 40 is formed on the display substrate 20, an electrode is formed on the spacing member, and a voltage is applied between the electrodes to cause the particle groups 34 to move between the display substrate 20 and the spacing member to achieve a display, may be also employed.

In the display medium 12 and the display device 10 according to any of the above-mentioned exemplary embodiments, it has been stated that the front electrode 40 is formed on the display substrate 20 and the rear electrode 46 is formed on the rear substrate 22 to constitute the display medium 12, but a configuration in which the electrodes are formed outside the display medium 12 may be employed.

In the display medium 12 and the display device 10 according to any of the above-mentioned exemplary embodiments, it has been stated that two or three types (two colors or three colors) of particle groups (34A and 34B) are employed as the particle group 34, but only one type (one color) of particle group may be employed or four types (four colors) or more of particle groups may be employed.

EXAMPLES

Hereinafter, the invention will be described in detail below with reference to examples.

Comparative Example 1

Production of Titanium Oxide Particle Dispersion

Titanium oxide particles (CR-EL made by Ishihara Sangyo Kaisha, Ltd., with a primary particle diameter of 0.25 µm): 1 part by weight KP-545 (made by Shin-Etsu Chemical Co., Ltd.): 0.15 part by weight Dimethyl silicone oil (KF-96L-2cs made by Shin-Etsu Silicone Co., Ltd., with viscosity of 2 cs): 10 parts by weight The materials are mixed with the above-mentioned compositions, 20 parts by weight of zirconium oxide beads (with φ1 mm) is added to the mixed solution, the resultant is dispersed with a rocking mill for 1 hour, and the zirconium oxide beads are removed, whereby a titanium oxide particle dispersion is obtained. The volume-average particle diameter of the obtained titanium oxide particles is 0.43 μm.

The obtained titanium oxide particle dispersion is used as a comparative white particle dispersion.

Example 1

Production of White Particle Dispersion 1

4-vinyl biphenyl(made by Nippon Steel Chemical Co., Ltd.): 1 part by weight

Silaplane FM-0721 (made by Chisso Corporation, with a weight-average molecular weight of Mw=5000 and with Structural Formula 1 ($R_1$=methyl group, $R_1'$=butyl group, n=68, and x=3)): 1 part by weight Lauroyl peroxide (made by Aldrich Chemical Company Inc.): 0.03 part by weight Isopar M (registered trademark, made by Exxon Mobil Corporation): 10 parts by weight hexane (made by Kanto Chemical Co., Inc.): 2 parts by weight toluene (made by Kanto Chemical Co., Inc.): 2 parts by weight The materials are mixed with the above-mentioned compositions, the resultant is heated at 65° C. for 18 hours, and then the solvent is substituted with dimethyl silicone oil (KF-96L-2cs made by Shin-Etsu Silicone Co., Ltd., with viscosity of 2 cs).

As a result, a resin particle dispersion including a copolymer containing 4-vinyl biphenyl as a polymeric component is obtained. The volume-average particle diameter of the resin particles is 0.53 μm.

The obtained resin particle dispersion is used as White Particle Dispersion 1.

Example 2

Production of White Particle Dispersion 2

4-vinyl biphenyl (made by Nippon Steel Chemical Co., Ltd.): 0.95 part by weight 4,4'-divinyl biphenyl (made by Synthonix Corporation): 0.05 part by weight Silaplane FM-0721 (made by Chisso Corporation, with a weight-average molecular weight of Mw=5000 and with Structural Formula 1 ($R_1$=methyl group, $R_1'$-butyl group, n=68, and x=3)): 1.5 parts by weight Lauroyl peroxide (made by Aldrich Chemical Company Inc.): 0.03 part by weight Isopar M (registered trademark, made by Exxon Mobil Corporation): 10 parts by weight hexane (made by Kanto Chemical Co., Inc.): 2 parts by weight toluene (made by Kanto Chemical Co., Inc.): 2 parts by weight The materials are mixed with the above-mentioned compositions, the resultant is heated at 65° C. for 18 hours, and then the solvent is substituted with dimethyl silicone oil (KF-96L-2cs made by Shin-Etsu Silicone Co., Ltd., with viscosity of 2 cs).

As a result, a resin particle dispersion including a copolymer containing 4-vinyl biphenyl and 4,4'-divinyl biphenyl as polymeric components is obtained. The volume-average particle diameter of the resin particles is 0.51 μm.

The obtained resin particle dispersion is used as White Particle Dispersion 2.

Example 3

Production of White Particle Dispersion 3

4,4'-divinyl biphenyl (made by Synthonix Corporation): 0.5 part by weight

Silaplane FM-0721 (made by Chisso Corporation, with a weight-average molecular weight of Mw=5000 and with Structural Formula 1 ($R_1$=methyl group, $R_1'$=butyl group, n=68, and x=3)): 1.5 parts by weight Lauroyl peroxide (made by Aldrich Chemical Company Inc.): 0.015 part by weight Isopar M (registered trademark, made by Exxon Mobil Corporation): 10 parts by weight hexane (made by Kanto Chemical Co., Inc.): 2 parts by weight toluene (made by Kanto Chemical Co., Inc.): 2 parts by weight The materials are mixed with the above-mentioned compositions, the resultant is heated at 65° C. for 18 hours, and then the solvent is substituted with dimethyl silicone oil (KF-96L-2cs made by Shin-Etsu Silicone Co., Ltd., with viscosity of 2 cs).

As a result, a resin particle dispersion including a copolymer containing 4,4'-divinyl biphenyl as a polymeric component is obtained. The volume-average particle diameter of the resin particles is 0.47 μm.

The obtained resin particle dispersion is used as White Particle Dispersion 3.

Evaluation

The obtained white particle dispersions are evaluated as follows. The results are described in Table 1.

Retention of Whiteness

A device sample in which the white particle dispersion of which the particle solid content (described in Table 1) is adjusted so that the degree of whiteness is 35% is enclosed between a pair of glass substrates (in a cell in which a spacer (spacing member) of 50 μm is interposed between a pair of glass substrates) having an indium tin oxide (ITO) electrode formed thereon is manufactured.

The manufactured device sample is left for 12 hours in a state where it is leaned vertically and then the degree of whiteness of the device sample is measured.

The evaluation criteria are defined as follows.

A: The degree of whiteness is equal to or higher than 30%.

B: The degree of whiteness is equal to or higher than 25% and lower than 30%.

C: The degree of whiteness is equal to or higher than 20% and lower than 25%.

D: The degree of whiteness is lower than 20%.

The degree of whiteness is calculated by measuring the white reflecting density by the use of a colorimeter X-Rite 404 (made by X-Rite Inc.) and converting the measured white reflecting density into white reflectance on the basis of the following expression.

$$\text{Degree of Whiteness(White Reflectance)} = 10^{-(white\ reflecting\ density)} \times 100\% \quad \text{Expression}$$

Amount of Charge

The obtained white particle dispersions are adjusted so that the particle solid content is 10 weight %, and then the amount of charge (nC) is measured by the use of 6515 SYSTEM ELECTROMETER (made by Keithley Instruments Inc.).

Display of Mixed Color

Manufacturing of Device Sample

Cyan particles with a solid content of 1.5 weight % and white particles with such solid contents to satisfy a degree of whiteness of 35% (described in Table 1) are mixed to obtain mixture dispersions.

Then, device samples in which the mixture dispersions are enclosed between a pair of glass substrates (in a cell in which spacers (the spacing members) of 50 μm are interposed between a pair of glass substrates) having an indium tin oxide (ITO) electrode formed thereon are manufactured.

Cyan Particle Dispersion 65 parts by weight of hydroxyethyl methacrylate, 30 parts by weight of Silaplane FM-0721 (made by Chisso Corporation, with a weight-average molecular weight of Mw=5000), and 5 parts by weight of methacrylate are mixed into 100 parts by weight of isopropyl alcohol and 0.2 part by weight of AIBN is dissolved as a polymerization initiator in the resultant mixture, and the resultant is polymerized in the atmosphere of nitrogen at 70° C. for 6 hours. The product is refined using hexane as a re-precipitating solvent and is then dried, whereby a polymer is obtained.

Then, 0.5 g of the polymer is added to and dissolved in 9 g of the isopropyl alcohol, and 0.5 g of a cyan pigment (Cyanine Blue 4973) made by Sanyo Color Works Ltd. is added to the resultant solution and is dispersed for 48 hours by the use of zirconium oxide balls with 0.5 mmφ, whereby a pigment-containing polymer solution is obtained.

3 g of this pigment-containing polymer solution is taken out, 12 g of silicone oil (KF96 made by Shin-Etsu Chemical Co., Ltd.) with viscosity of 2 cs is dropped therein to emulsify the resultant by a small amount while applying ultrasonic waves thereto, and the resultant is heated to 60° C. and depressurized and dried to evaporate IPA, whereby electrophoretic particles including a polymer and a pigment are obtained. Thereafter, the particles are precipitated by the use of a centrifuge, the supernatant is removed, 5 g of the silicone oil is added thereto, ultrasonic waves are applied thereto, the resultant is washed, the particles are precipitated by the use of a centrifuge, the supernatant is removed, and 5 g of the silicone oil is further added thereto, whereby a cyan particle dispersion is obtained. The volume-average particle diameter of the obtained cyan particles is 0.2 μm.

The charged polarity of the particles in the dispersion is measured as a negative (−) polarity by enclosing the dispersion between two sheets of electrode substrates, applying a DC voltage thereto, and then evaluating the electrophoresis direction.

Evaluation Method

A DC (Direct Current) voltage of 10 V is applied to both electrodes of the device sample and the polarities (+) and (−) are reversed to cause the cyan particles to move. When the positive (+) voltage is applied to the display electrode, the cyan particles move to the display glass substrate to display cyan. On the other hand, when the negative (−) voltage is applied to the display electrode, the cyan particles move to the rear glass substrate to display white.

The mixed color display of cyan and white when the positive (+) voltage is applied to the display electrode to display cyan is evaluated. Specifically, the cyan density when a positive voltage is applied to the display substrate is measured and evaluated by the use of a colorimeter X-Rite 404 (made by X-Rite Inc.).

The evaluation criteria are as follows.

A: The cyan density is equal to or higher than 0.9.

B: The cyan density is equal to or higher than 0.7 and lower than 0.9.

C: The cyan density is equal to or higher than 0.5 and lower than 0.7.

D: The cyan density is lower than 0.5.

Viscosity

The solid content of the obtained white particle dispersions is adjusted (described in Table 1) so that the degree of whiteness is 35%, and the viscosity of the dispersions is measured by the use of a digital viscometer LVDV II+ (made by Brookfield Engineering Laboratories).

Here, the viscosity of a reference white particle dispersion (with a particle solid content of 25 weight %) is measured as 5.9 cP in the same way.

Reference White Particle Dispersion 4-vinylnaphthalene (made by Nippon Steel Chemical Co., Ltd.): 1 part by weight Silaplane FM-0721 (made by Chisso Corporation, with a weight-average molecular weight of Mw=5000): 1 part by weight Lauroyl peroxide (made by Aldrich Chemical Company Inc.): 0.03 part by weight The materials are mixed with the above-mentioned compositions, the resultant is heated at 65° C. for 18 hours, and then the solvent is substituted with dimethyl silicone oil (KF-96L-2cs made by Shin-Etsu Silicone Co., Ltd., with viscosity of 2 cs).

As a result, a vinylnaphthalene particle dispersion is obtained.

The obtained vinylnaphthalene particle dispersion is used as the reference white particle dispersion.

TABLE 1

| | Retention of whiteness | | | |
|---|---|---|---|---|
| Evaluation | Particle solid content of white particle dispersion at whiteness of 35% (weight %) | Amount of charge (nC) | Display of mixed color | Viscosity (cP) |
| Com. Ex. 1 | D | 10 | 210 | D | 2.3 |
| Ex. 1 | A | 25 | 2.4 | A | 4.6 |
| Ex. 2 | A | 25 | 2.5 | A | 4.3 |
| Ex. 3 | A | 25 | 2.8 | A | 4.2 |

It can be seen from the above results that the examples have a larger particle solid content in the white particle dispersions at the degree of whiteness of 35% but are more excellent in retention of whiteness, compared with the comparative example.

It can be also seen that the examples have a smaller amount of charge of the white particles in the white particle dispersion, are more excellent in the display of a mixed color, and have reduced electric field responsiveness of the white particles, compared with the comparative example.

It can be also seen that the reference white particle dispersion shows increased viscosity, compared with the white particle dispersions of the examples and the comparative example.

Comparative Example 2

Surface Treatment of Titanium Oxide Particle

Titanium oxide particle (MAXLIGHT TS-01 made by Showa Denko K.K., with a volume-average particle diameter of 0.1 μm): 1 part by weight
3-methacryloxypropyl trichlorosilane (made by Gelest Inc.): 0.5 part by weight
Toluene (made by Kanto Chemical Co., Inc.): 10 parts by weight The materials are mixed with the above-mentioned compositions, 20 parts by weight of glass beads (φ1 mm) is added thereto, and the resultant is dispersed by the use of a rocking mill for 2 hours, whereby surface treatment is performed on the titanium oxide particles (hereinafter, referred to as "surface-treated titanium oxide particles").

Production of Silicone Polymer Dispersant

Silaplane FM-0721 (made by Chisso Corporation, with a weight-average molecular weight of Mw=5000 and with Structural Formula 1 ($R_1$=methyl group, $R_1'$=butyl group, n=68, and x=3)): 10 parts by weight
Styrene (made by Wako Pure Chemical Industries, Ltd.): 10 parts by weight
Lauroyl peroxide (made by Aldrich Chemical Company Inc.): 0.5 part by weight
Toluene (made by Kanto Chemical Co., Inc.): 20 parts by weight The materials are mixed with the above-mentioned compositions, the resultant is made to react at 65° C. for 24 hours, and the resultant is re-precipitated and refined in hexane (made by Pure Chemical Industries, Ltd.) and is dried, whereby a silicone polymer dispersant is obtained.

Production of Comparative White Particle Dispersion

Surface-treated titanium oxide particle: 0.5 part by weight
Silicone polymer dispersant: 0.15 part by weight
Dimethyl silicone oil (KF-96L-2cs made by Shin-Etsu Silicone Co., Ltd., with viscosity of 2 cs): 10 parts by weight The materials are mixed with the above-mentioned compositions, 20 parts by weight of zirconium oxide beads (φ1 mm) is added to the mixed solution, the resultant is dispersed by the use of a rocking mill for 1 hour, and the zirconium oxide beads are removed, whereby a titanium oxide particle dispersion is obtained. The volume-average particle diameter of the titanium oxide particles is 0.52 μm.

The obtained titanium oxide particle dispersion is used as a comparative white particle dispersion.

Example 4

Production of Titanium Oxide Particle Dispersion 1

Surface-treated titanium oxide particles (which are the same as obtained in Comparative Example 1): 0.5 part by weight
Silicone polymer dispersant (which is the same as obtained in Comparative Example 1): 0.15 part by weight
Isopar M (registered trademark, made by Exxon Mobil Corporation): 10 parts by weight
Hexane: 2 parts by weight
Toluene: 2 parts by weight The materials are mixed with the above-mentioned compositions, 20 parts by weight of zirconium oxide beads (φ1 mm) is added to the mixed solution, the resultant is dispersed by the use of a rocking mill for 1 hour, and the zirconium oxide beads are removed, whereby Titanium Oxide Particle Dispersion 1 is obtained.

Production of White Particle Dispersion 4

Titanium Oxide Particle Dispersion 1: 14 parts by weight
4-vinyl biphenyl (made by Nippon Steel Chemical Co., Ltd.): 1 part by weight
Silaplane FM-0721 (made by Chisso Corporation, with a weight-average molecular weight of Mw=5000 and with Structural Formula 1 ($R_1$=methyl group, $R_1'$=butyl group, n=68, and x=3)): 1 part by weight
Lauroyl peroxide (made by Aldrich Chemical Company Inc.): 0.03 part by weight The materials are mixed with the above-mentioned compositions, the resultant is heated at 65° C. for 18 hours, and then the solvent is substituted with dimethyl silicone oil (KF-96L-2cs made by Shin-Etsu Silicone Co., Ltd., with viscosity of 2 cs).

As a result, a titanium oxide particle dispersion in which the particles are coated with a coating layer including a copolymer containing 4-vinyl biphenyl as a polymeric component is obtained. The volume-average particle diameter of the titanium oxide particles coated with the coating layer is 0.58 μm.

The obtained titanium oxide particle dispersion is used as White Particle Dispersion 4.

Example 5

Production of White Particle Dispersion 5
Titanium Oxide Particle Dispersion 1 (which is the same as obtained in Example 4): 14 parts by weight
4-vinyl biphenyl (made by Nippon Steel Chemical Co., Ltd.): 0.95 part by weight
4,4'-divinyl biphenyl (made by Synthonix Corporation): 0.05 part by weight
Silaplane FM-0721 (made by Chisso Corporation, with a weight-average molecular weight of Mw=5000 and with Structural Formula 1 ($R_1$=methyl group, $R_1'$=butyl group, n=68, and x=3)): 1.5 parts by weight
Lauroyl peroxide (made by Aldrich Chemical Company Inc.): 0.03 part by weight The materials are mixed with the above-mentioned compositions, the resultant is heated at 65° C. for 18 hours, and then the solvent is substituted with dimethyl silicone oil (KF-96L-2cs made by Shin-Etsu Silicone Co., Ltd., with viscosity of 2 cs).

As a result, a titanium oxide particle dispersion in which the particles are coated with a coating layer including a copolymer containing 4-vinyl biphenyl and 4,4'-divinyl biphenyl as polymeric components is obtained. The volume-average particle diameter of the titanium oxide particles coated with the coating layer is 0.53 μm.

The obtained titanium oxide particle dispersion is used as White Particle Dispersion 5.

Example 6

Production of White Particle Dispersion 6

Titanium Oxide Particle Dispersion 1 (which is the same as obtained in Example 4): 14 parts by weight
4,4'-divinyl biphenyl (made by Synthonix Corporation) 0.5 part by weight
Silaplane FM-0721 (made by Chisso Corporation, with a weight-average molecular weight of Mw=5000 and with Structural Formula 1 ($R_1$=methyl group, $R_1'$=butyl group, n=68, and x=3)): 1.5 parts by weight Lauroyl peroxide (made by Aldrich Chemical Company Inc.): 0.015 part by weight The materials are mixed with the above-mentioned compositions, the resultant is heated at 65° C. for 18 hours, and then the solvent is substituted with dimethyl silicone oil (KF-96L-2cs made by Shin-Etsu Silicone Co., Ltd., with viscosity of 2 cs).

As a result, a titanium oxide particle dispersion in which the particles are coated with a coating layer including a copolymer containing 4,4'-divinyl biphenyl as a polymeric component is obtained. The volume-average particle diameter of the titanium oxide particles coated with the coating layer is 0.49 μm.

The obtained titanium oxide particle dispersion is used as White Particle Dispersion 6.

Evaluation

The obtained white particle dispersions are evaluated as follows. The results are described in Table 2.

Amount of Charge

The obtained white particle dispersions are adjusted so that the particle solid content is 10 weight %, and then the amount of charge (nC) is measured by the use of 6515 SYSTEM ELECTROMETER (made by Keithley Instruments Inc.).

Display of Mixed Color

Manufacturing of Device Sample

Cyan particles with a solid content of 1.5 weight % and white particles with such solid contents to satisfy a degree of whiteness of 50% (described in Table 2) are mixed to obtain mixture dispersions.

Then, device samples in which the mixture dispersions are enclosed between a pair of glass substrates (in a cell in which spacers (the spacing members) of 50 μm are interposed between a pair of glass substrates) having an indium tin oxide (ITO) electrode formed thereon are manufactured.

Cyan Particle Dispersion 65 parts by weight of hydroxyethyl methacrylate, 30 parts by weight of Silaplane FM-0721 (made by Chisso Corporation, with a weight-average molecular weight of Mw=5000), and 5 parts by weight of methacrylate are mixed into 100 parts by weight of isopropyl alcohol and 0.2 part by weight of AIBN is dissolved as a polymerization initiator in the resultant mixture, and the resultant is polymerized in the atmosphere of nitrogen at 70° C. for 6 hours. The product is refined using hexane as a re-precipitating solvent and is then dried, whereby a polymer is obtained.

Then, 0.5 g of the polymer is added to and dissolved in 9 g of the isopropyl alcohol, and 0.5 g of a cyan pigment (Cyanine Blue 4973) made by Sanyo Color Works Ltd. is added to the resultant solution and is dispersed for 48 hours by the use of zirconium oxide balls with 0.5 mmφ, whereby a pigment-containing polymer solution is obtained.

3 g of this pigment-containing polymer solution is taken out, 12 g of silicone oil (KF96 made by Shin-Etsu Chemical Co., Ltd.) with viscosity of 2 cs is dropped therein to emulsify the resultant by a small amount while applying ultrasonic waves thereto, and the resultant is heated to 60° C. and depressurized and dried to evaporate IPA, whereby electrophoretic particles including a polymer and a pigment are obtained. Thereafter, the particles are precipitated by the use of a centrifuge, the supernatant is removed, 5 g of the silicone oil is added thereto, ultrasonic waves are applied thereto, the resultant is washed, the particles are precipitated by the use of a centrifuge, the supernatant is removed, and 5 g of the silicone oil is further added thereto, whereby a cyan particle dispersion is obtained. The volume-average particle diameter of the obtained cyan particles is 0.2 μm.

The charged polarity of the particles in the dispersion is measured as a negative (−) polarity by enclosing the dispersion between two sheets of electrode substrates, applying a DC voltage thereto, and then evaluating the electrophoresis direction.

Evaluation Method

A DC (Direct Current) voltage of 10 V is applied to both electrodes of the device sample and the polarities (+) and (−) are reversed to cause the cyan particles to move. When the positive (+) voltage is applied to the display electrode, the cyan particles move to the display glass substrate to display cyan. On the other hand, when the negative (−) voltage is applied to the display electrode, the cyan particles move to the rear glass substrate to display white.

The mixed color display of cyan and white when the positive (+) voltage is applied to the display electrode to display cyan is evaluated. Specifically, the cyan density when a positive voltage is applied to the display substrate is measured and evaluated by the use of a colorimeter X-Rite 404 (made by X-Rite Inc.).

The evaluation criteria are as follows.

A: The cyan density is equal to or higher than 0.9.

B: The cyan density is equal to or higher than 0.7 and lower than 0.9.

C: The cyan density is equal to or higher than 0.5 and lower than 0.7.

D: The cyan density is lower than 0.5.

Degree of Whiteness

A device sample in which the white particle dispersion is enclosed between a pair of glass substrates (in a cell in which a spacer (spacing member) of 50 μm is interposed between a pair of glass substrates) having an indium tin oxide (ITO) electrode formed thereon is manufactured.

The particle solid content of the white particle dispersion at a degree of whiteness of 50% in the manufactured device sample is measured.

The degree of whiteness is calculated by measuring the white reflecting density by the use of a colorimeter X-Rite 404 (made by X-Rite Inc.) and converting the measured white reflecting density into white reflectance on the basis of the following expression.

$$\text{Degree of Whiteness(White Reflectance)} = 10^{-(white\ reflecting\ density)} \times 100\% \quad \text{Expression}$$

Viscosity

The solid content of the obtained white particle dispersions is adjusted (described in Table 2) so that the chromaticity is 50%, and the viscosity of the dispersions is measured by the use of a digital viscometer LVDV II+ (made by Brookfield Engineering Laboratories).

Here, the viscosity of a reference white particle dispersion (with a particle solid content of 20 weight %) is measured as 3.9 cP in the same way.

Reference White Particle Dispersion

Titanium Oxide Particle Dispersion 1 (which is the same as obtained in Example 4): 14 parts by weight 4-vinylnaphthalene (made by Nippon Steel Chemical Co., Ltd.): 1 part by weight Silaplane FM-0721 (made by Chisso Corporation, with a weight-average molecular weight of Mw=5000 with Structural Formula 1 ($R_1$=methyl group, $R_1'$=butyl group, n=68, and x=3)): 1 part by weight Lauroyl peroxide (made by Aldrich Chemical Company Inc.): 0.03 part by weight The materials are mixed with the above-mentioned compositions, the resultant is heated at 65° C. for 18 hours, and then the solvent is substituted with dimethyl silicone oil (KF-96L-2cs made by Shin-Etsu Silicone Co., Ltd., with viscosity of 2 cs).

As a result, a titanium oxide particle dispersion in which the particles are coated with a coating layer including a copolymer containing 4-vinylnaphthalene as a polymeric component is obtained.

The obtained titanium oxide particle dispersion is used as the reference white particle dispersion.

TABLE 2

| | Amount of charge (nC) | Display of mixed color | Particle solid content of white particle dispersion at whiteness of 50% (weight %) | Viscosity (cP) |
|---|---|---|---|---|
| Com. Ex. 2 | 230 | D | 18 | 2.8 |
| Ex. 4 | 30 | A | 20 | 3.2 |
| Ex. 5 | 28 | A | 20 | 3.2 |
| Ex. 6 | 24 | A | 20 | 3.1 |

It can be seen from the above results that the examples have a smaller amount of charge of the white particles in the white particle dispersions, are more excellent in the display of a mixed color, and have reduced electric field responsiveness of the white particles, compared with the comparative example.

It can be also seen that the examples have a larger particle solid content in the white particle dispersions at the degree of whiteness of 50% but the increase is small, compared with the comparative example.

It can be also seen that the reference white particle dispersion shows increased viscosity, compared with the white particle dispersions of the examples and the comparative example.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A white particle for display comprising as a constituent element:
    a polymer including at least one species selected from a biphenyl compound having one vinyl group and a biphenyl compound having two vinyl groups as a polymeric component.

2. The white particle for display according to claim 1, wherein the biphenyl compound having one vinyl group is monovinyl biphenyl and the biphenyl compound having two vinyl groups is divinyl biphenyl.

3. The white particle for display according to claim 1, wherein the polymer is a copolymer of the polymeric component including at least one species selected from the biphenyl compound having one vinyl group and the biphenyl compound having two vinyl groups and a polymeric component having a silicone chain.

4. The white particle for display according to claim 3, wherein the polymeric component having the silicone chain is a dimethyl silicone compound having an acrylate group or a methacrylate group at one terminal.

5. The white particle for display according to claim 3, wherein the polymeric component having the silicone chain is a compound expressed by Structural Formula 1:

Structural Formula 1

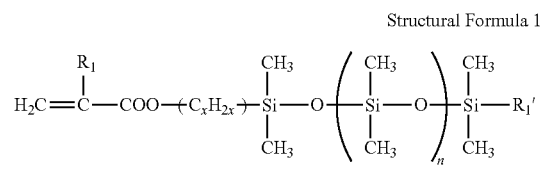

wherein $R_1$ represents a hydrogen atom or a methyl group, $R_1'$ represents a hydrogen atom or an alkyl group with a carbon number of from 1 to 4, n represents a natural number, and x represents an integer of from 1 to 3.

6. A particle dispersion for display comprising:
    a particle group including the white particle for display according to claim 1; and
    a dispersion medium that is used to disperse the particle group.

7. A display medium comprising:
    a pair of substrates of which at least one has a light-transmitting property and that is disposed with a gap interposed therebetween;
    an electrophoretic particle group that is enclosed between the pair of substrates and that is electrophoresed in accordance with an electric field;
    a white particle group that is enclosed between the pair of substrates and that includes the white particle for display according to claim 1; and
    a dispersion medium that is enclosed between the pair of substrates and that is used to disperse the electrophoretic particle group and the white particle group.

8. A display device comprising:
    a display medium according to claim 7; and
    an electric field generating unit that generates an electric field between the pair of substrates.

9. A white particle for display comprising:
    an inorganic white particle; and
    a coating layer with which the inorganic white particle is coated and that includes as a constituent component a polymer including at least one species selected from a biphenyl compound having one vinyl group and a biphenyl compound having two vinyl groups as a polymeric component.

10. The white particle for display according to claim 9, wherein the biphenyl compound having one vinyl group is monovinyl biphenyl and the biphenyl compound having two vinyl groups is divinyl biphenyl.

11. The white particle for display according to claim 9, wherein the polymer is a copolymer of the polymeric component including at least one species selected from the biphenyl compound having one vinyl group and the biphenyl compound having two vinyl groups and a polymeric component having a silicone chain.

12. The white particle for display according to claim 11, wherein the polymeric component having the silicone chain is a dimethyl silicone compound having an acrylate group or a methacrylate group at one terminal.

13. The white particle for display according to claim 11, wherein the polymeric component having the silicone chain is a compound expressed by Structural Formula 1:

Structural Formula 1

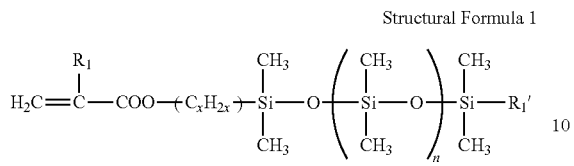

wherein $R_1$ represents a hydrogen atom or a methyl group, $R_1'$ represents a hydrogen atom or an alkyl group with a carbon number of from 1 to 4, n represents a natural number, and x represents an integer of from 1 to 3.

14. A particle dispersion for display comprising:
a particle group including the white particle for display according to claim 9; and
a dispersion medium that is used to disperse the particle group.

15. A display medium comprising:
a pair of substrates of which at least one has a light-transmitting property and that is disposed with a gap interposed therebetween;
an electrophoretic particle group that is enclosed between the pair of substrates and that is electrophoresed in accordance with an electric field;
a white particle group that is enclosed between the pair of substrates and that includes the white particle for display according to claim 9; and
a dispersion medium that is enclosed between the pair of substrates and that is used to disperse the electrophoretic particle group and the white particle group.

16. A display device comprising:
a display medium according to claim 15; and
an electric field generating unit that generates an electric field between the pair of substrates.

* * * * *